United States Patent [19]

Johnson et al.

[11] Patent Number: 5,689,637

[45] Date of Patent: Nov. 18, 1997

[54] CONSOLE SIMULATOR, MULTI-CONSOLE MANAGEMENT SYSTEM AND CONSOLE MANAGEMENT DISTRIBUTION SYSTEM

[76] Inventors: R. Brent Johnson, 10816 E. Newton St., Tulsa, Okla. 74116; Darrell B. Burson, P.O. Box 580068, Tulsa, Okla. 74158

[21] Appl. No.: 675,784

[22] Filed: Jul. 5, 1996

Related U.S. Application Data

[62] Division of Ser. No. 367,950, Jan. 3, 1995, Pat. No. 5,592,657, which is a continuation of Ser. No. 47,754, Apr. 13, 1993, abandoned, which is a continuation-in-part of Ser. No. 877,886, May 1, 1992, abandoned.

[51] Int. Cl.$^6$ .................................................. G06F 9/455
[52] U.S. Cl. ............................................. 395/183.22
[58] Field of Search .................. 364/DIG. 1 MS File, 364/DIG. 2 MS File; 434/29, 118; 395/50, 885, 600, 500, 180, 181, 183.01, 183.08, 183.15, 183.22, 184.01

[56] References Cited

U.S. PATENT DOCUMENTS

| | | | |
|---|---|---|---|
| 3,601,905 | 8/1971 | Epstein | 35/13 |
| 4,434,460 | 2/1984 | Drakenborn et al. | 395/885 |
| 4,622,013 | 11/1986 | Cerchio | 434/118 |
| 4,694,411 | 9/1987 | Burrows | 364/578 |
| 4,772,206 | 9/1988 | Kerr et al. | 434/118 |
| 4,965,743 | 10/1990 | Malin et al. | 395/50 |
| 5,049,873 | 9/1991 | Robins et al. | 340/825.06 |
| 5,062,045 | 10/1991 | Janis et al. | 395/600 |
| 5,240,419 | 8/1993 | deGyarfas | 434/322 |
| 5,247,517 | 9/1993 | Ross et al. | 370/85.5 |
| 5,261,044 | 11/1993 | Dev et al. | 395/159 |
| 5,275,565 | 1/1994 | Moncrief | 434/29 |
| 5,311,422 | 5/1994 | Loftin et al. | 364/401 |

FOREIGN PATENT DOCUMENTS

0162967A1  12/1985  European Pat. Off.

*Primary Examiner*—Robert B. Harrell
*Attorney, Agent, or Firm*—Head, Johnson & Kachigian

[57] ABSTRACT

A computer implemented system for simulating functions of a mainframe computer monitor console. A first central processing unit is in communication with a memory for storing of mainframe operator resonse messages from a mainframe operating system and for storing data representing status of said simulated mainframe computer monitor console. A second central processing unit is in communication with the first central processing unit. Operator input messages are inputed into the second central processing unit through an interface. A simulator engine stored in the memory and executed by the first central processing unit selects messages from the mainframe operator response message database; selects response messages that are unsolicited with respect to operator input messages; selects response messages from a random events list; and updates data representing the status of the simulated computer monitor console. A display connected to the second central processing unit displays the operator input messages and the selected mainframe operator response messages communicated from the first central processing unit.

7 Claims, 24 Drawing Sheets

CONSOLE SIMULATOR, MULTI-CONSOLE MANAGEMENT SYSTEM AND CONSOLE MANAGEMENT DISTRIBUTION SYSTEM

This is a divisional application of Ser. No. 08/367,950 filed on Jan. 3, 1995, now U.S. Pat. No. 5,592,657, which is a continuation application of Ser. No. 08/047,754 filed Apr. 13, 1993, now abandoned, which is a continuation-in-part application of Ser. No. 07/877,886 filed May 1, 1992, now abandoned.

BACKGROUND OF THE INVENTION

1. Field of the Invention

The present invention is directed to three main areas: (1) a computer console simulator, (2) a multi-console system to allow simultaneous control of multiple computer consoles and (3) a system to distribute computer console management to multiple users.

2. Prior Art

In many industries and businesses, large numbers of transactions are processed by computer on an around-the-clock basis. As an example, certain airline reservation facilities may process 1,000 transactions per second. Because of this demand, multiple main frame central processing units for computers are utilized within a computer complex.

Typically, each main frame computer will be connected to at least one console, including a keyboard and display terminal for operations personnel to monitor and control the operation of the system.

The usefulness of a simulator disclosed in this invention may be appreciated from a discussion about main frame computer operations and how they have been changing. This discussion will also cover the different types of computer environments, the function of the operator and operations staff, and the move in the past few years to operations automation.

Main frame computer systems require personnel to handle various tasks related to the computer's operations. In earlier computer complexes, operations staff would be responsible for insuring that jobs (a job would be any task the computer might be needed to do, such as monthly payroll) were started on time and finished properly, that the appropriate tapes and disk packs were available to complete the jobs, and to watch over the operation of the computer in general. As computer complexes have progressed, some of these tasks, such as job scheduling, have been programmed into the computer. Operations staff, however, are still necessary to perform the task of handling resources and watching over the general operation of the computer.

The operations staff's interface with the computer is through the computer console. This console is used to display status messages about the computer system and allows the operations staff to control the operations of the computer. For example, a job running on the computer may require data from a tape. The job will send a message to the operator via the console requesting that the tape be mounted. The operator will then mount the requested tape and inform the computer system, and the job, that it is available by making an entry at the console. Other types of messages displayed may be about errors or critical situations occurring on the computer system. The operations staff must be aware of what each message displayed by the console means and what type of response is required.

Adding to the work load of the operations staff has been the advent of multiple operating systems. Originally, an operations staff would be required to watch over one or two computers that did principally the same types of functions. In today's environments, operations staff may be responsible for multiple computer complexes running multiple computer operating systems. In some shops operations staff are responsible for maintaining systems for various branches of a company, with each branch having some unique data processing requirements. In extremely large shops, such as those run by airlines, many copies of the same operating system are run for various purposes as well as many different types of operating systems. For example, an airline will require computers to handle flight planning, load balancing, and reservations, as well as having development and test systems. Many of these functions will run on different computers with different operating systems. It will be the responsibility of the operations staff to insure that all of these systems run properly and without any outages (an outage is the time when a given computer or group of computers have failed). The operations staff must be aware of what messages may be issued from a given complex of machines and how to react to them in the most efficient manner.

Along with the added complexity of the computing environment have come more advanced tools for the operations staff. The operator interface has become much more advanced using new PC technology. This technology allows the console system itself to do some of the work of the operator. This type of console management is often referred to as operator or operations automation. It is simply the programming of the new console systems to handle the job of the operator. As the console systems advance, these programs will become more and more critical and more and more complicated.

The simulator presented here is designed to address two problems that have now come to light. The first is the training of operations staff. With more complex and more critical operating environments, operations staff need a facility to train new staff and re-train existing staff. The other area that the simulator addresses is the testing of new automation functions. These functions are becoming more and more complex and cannot be placed in a critical environment without prior testing.

The current form of training for new operations staff is to place them with experienced staff and allow them to learn by experience on actual working systems. Often times new operators may run development or test systems until they are considered to have sufficient experience to be moved to actual working systems. These methods of training are inadequate in that they are very time consuming, require a great deal of supervision, and may not provide adequate training for all situations. New operators may not be exposed to all types of situations that may occur and test systems seldom reflect the events that occur with online systems.

The simulator can address this problem by simulating an operations environment that allows operators to make mistakes, analyze, and correct them. Critical situations may be created to train new operators on how to deal with unknown or little known situations. The simulator also provides the ability to train existing staff on new procedures before they are implemented. This prevents any confusion when new procedures or staff are added to the complex.

In the case of operations automation, there is presently no adequate method to test new automation procedures. The events that are being automated may never occur in the development environment or development test systems. Neither can automation procedures be allowed directly on online systems since their failure may have severe repercussions.

The simulator addresses this problem by recreating the test events repeatedly for debugging purposes while giving the developer control over the simulated environment. The simulator may also be used in regression testing of automation products to insure they do not effect other automation procedures or other operations of the system.

There is a need, therefore, to provide a console simulator apparatus to simulate an environment for training operations personnel and in order to test operations automation.

Main frame computer systems are large systems such as those used by airlines for reservations. The computers in these systems use a main operations console that is responsible for running the system. The operations staff who use these consoles are responsible for insuring that other users of the computer will have access to the computer's resources and functions. It is from these consoles that each computer in a complex is monitored and controlled. In many cases there are multiple computers running in a complex running multiple operating systems. There may be several computers dedicated to testing and developing new software, there may be other computers dedicated to maintaining accounting and inventory systems, and there may be computers that are connected to outside users for information access. Each of these tasks may require multiple computers and each separate task may require differing operating systems. Each of these computers has at least one and maybe multiple operations consoles. Each operating system will also deal with its console interface in a different way. The operations staff at a computer site may, therefore, be required to handle many different types of situations at any time and possibly all of the time.

There have been many efforts to simplify this situation, mostly through software on the main frame computers themselves. In most cases these have not met with great success because of the disparate operating systems being used. Each handles its consoles differently and cannot be combined with other systems. Interconnectivity between console systems from within the different operating systems is a difficult task involving software to communicate between each system and more software to interpret the messages from the other operating systems. These systems become very cumbersome and difficult to maintain. If one operating system is modified it may require major work to the other operating systems, and changing an operating system is a task that most computer sites avoid. Such a change may cause adverse effects throughout the computer system.

Another direction of console software is for operations automation. Many operating systems have been made "smarter" to handle conditions from within the system that used to be handled by operations staff. These software modifications, however, cannot keep "watch" over entire complexes of computers due to lack of connectivity. They also lack the ability to "understand" different operating systems.

All of this leads to a greater complexity of the operations environments. This, combined with a greater need for system reliability and availability, requires more advanced methods for computer operations. Computer users are requiring that their systems be available world-wide, 24 hours a day. Down time for major computer users is measured in thousands of dollars per minute and the cost is rising.

There is a need, therefore, to allow multiple main frame computer consoles to be operated from a single work station.

Current main frame processing environments use a single console, usually the operator console, to display messages about the system's status. It is the operator's job to monitor the system through these messages and note any problems that may occur. This type of configuration limits the dissemination of information. That is, if a problem occurs, only the operations staff has access to the information coming from the system to solve it. The problem may be outside of the operations staff's ability to handle. In these cases, systems programmers and others need to be involved in the problem's resolution; however, the information is not readily available to them. To solve this problem requires the ability to spread the information from the operations console to other areas.

There are other problems inherent in a single console system. Another involves new automation techniques that are being created for system consoles. Many new automation systems are run separate from the operating system. That is, they are run on microcomputer workstations and not within the main frame computer itself. These automation facilities will draw more and more resources from the operations console package as they become more sophisticated. If this work load could be spread across other workstations, it would ease many of the problems of operations automation.

CROSS-REFERENCE TO APPLICATION

This application is a continuation-in-part of U.S. patent application Ser. No. 07/877,886, filed May 1, 1992, entitled "An Apparatus to Simulate a Mainframe Console, to Control More than a Single Mainframe and to Distribute Mainframe Management to Multiple Users", now abandoned.

DETAILED DESCRIPTION OF THE PREFERRED PROCESSES AND EMBODIMENTS

The present invention comprises three main areas: (1) a computer console simulator, (2) a multi-console system to allow simultaneous control of multiple computers, and (3) a system to distribute console management to multiple users.

Each area will be discussed separately, although it will be understood that they may operate together. In the present embodiments to be discussed, each area is related. A single system may include one or more of these improvements.

Console Simulator

The console simulator utilizes a simulator central processing unit that may be implemented on standard personal computer hardware. The simulator runs on a personal computer and communicates with a console management personal computer.

The computer console simulator may be controlled by an operator; alternately, it may also run as a free-standing system. The present invention outputs simulated computer console messages to a console management system, and may also receive input from the console management system. The flowchart drawings in FIGS. 1 through 8 show the main processes and components.

The actual simulation process relies on a special database of messages and responses. In one embodiment, the database resides on a hard disk and may be read into the computer memory as needed. Since each computer operating system has different input and output messages, and each computer complex may have special messages particular to their environment, the database information may be different for each implementation. The simulator software itself runs as an "engine" to drive the simulation based on the information in the database.

Figure 1:
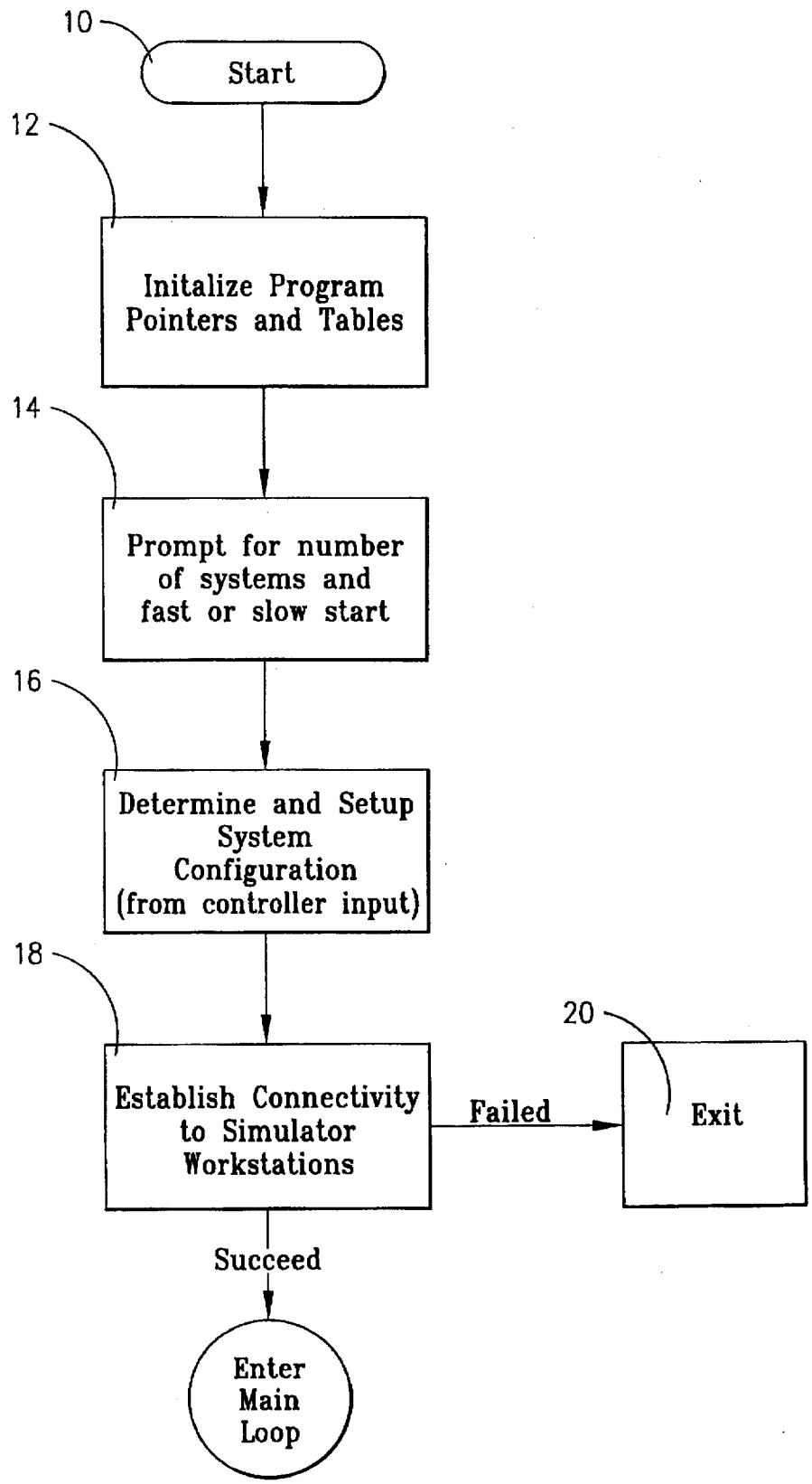
FIG. 1 is a flowchart of startup processing of the computer console simulator.
Figure 2:
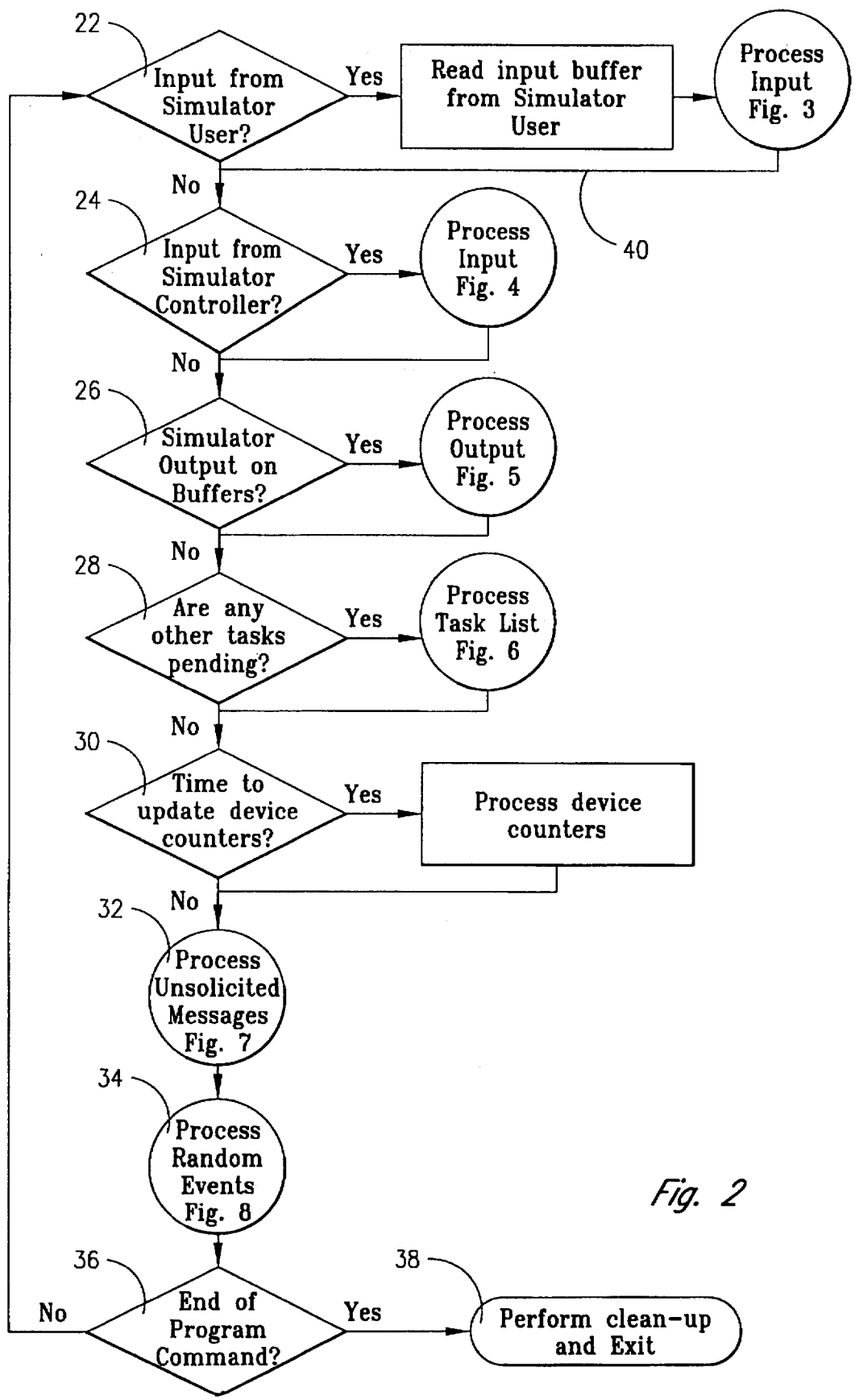
FIG. 2 is a flowchart of the main loop of the computer console simulator.
Figure 3:
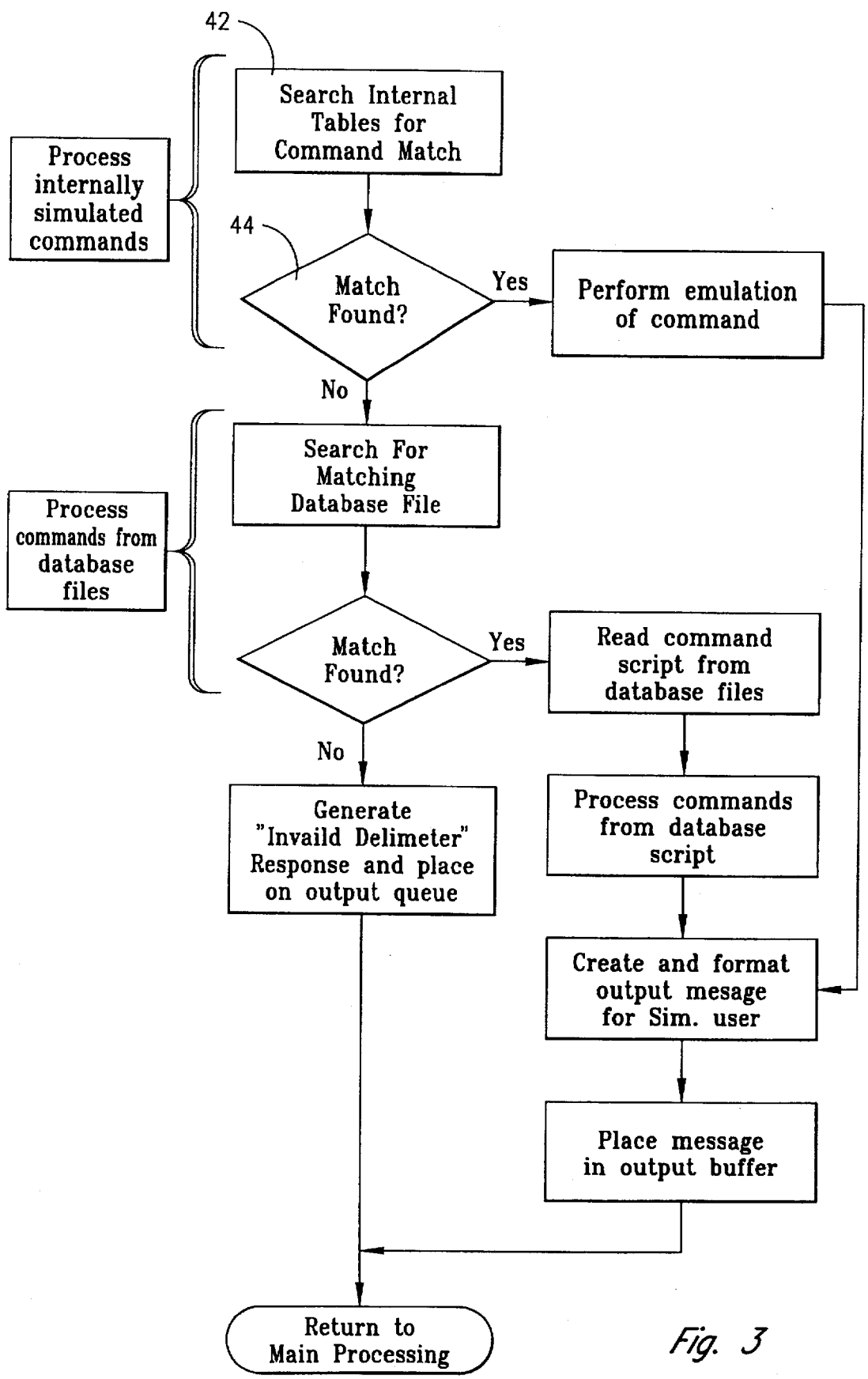
FIG. 3 is a flowchart of the workstation input handling of the computer console simulator.

Referring to FIG. 1, once the simulator has been started 10, the startup processing for the simulator involves general housekeeping procedures of initializing data areas and verifying operating conditions 12. Once the general startup processing is complete, the simulator controller is prompted for the number of systems to be simulated. The simulator can run multiple simulations simultaneously. The operator may then choose whether the simulated systems require IPLing (Initial Program Loading), that is the simulator must simulate a complete IPL sequence, or simulate whether they are running, as they would appear in everyday operations. This is depicted in box 14 as "fast or slow start".

Once the simulator controller has completed the initialization sequence, a series of questions will be presented to the controller for response in order to determine and set up system configuration 16. The simulator will attempt to establish connections to the simulator workstations 18. If communications cannot be established the simulator will issue error messages and stop 20.

The simulator will enter its main processing loop once connectivity has been established. This loop is shown in the flowchart in FIG. 2. This loop will run continuously until the simulator controller issues a shutdown command. The main loop will be responsible for all simulator activities including communications with simulator workstations, presenting status to the controller, database manipulation, and random event processing.

In brief overview, the first section 22 of the main loop checks for input from the simulator work stations. The second step 24 checks for commands from the simulator controller. The third step 26 scans the output message buffers. The fourth step 28 checks on pending tasks. The fifth step 30 scans simulated resources for updates. Step six 32 processes unsolicited messages, and the final step 34 checks for random events. The end step 36 of the loop checks for simulator shutdown requests. If a shutdown request occurred during processing, the main loop would be exited and the cleanup/shutdown procedure run, as shown at 38.

The first step of the loop, checking for simulator workstation input 22, involves checking the input buffers for messages. These buffers are filled by the communications interrupt code. This code reads characters from the communications interface and places the finished message in a buffer as shown at box 40. When the buffer is ready to be processed, there is a status flag set by the interrupt code. This status flag signals the simulator workstation input processing routine from the main loop. A search is conducted for internal commands. This routine, shown on FIG. 3, searches for a match in the simulator database for the input as shown at box 42. If a match is found as at 44, the information from the database is used to generate a response to the simulator workstation. This response is then queued for output. This output contains the message to be sent as well as destination information. The destination information is used to route the output to the appropriate user. The information in the database may cause the processing to extract information from the simulated system resources that the simulator keeps. It may require generation of random information to be supplied in the message. The information in the database is used to instruct the simulator on construction of the output message.

If no match can be found for the input message, a default error message is processed from the database.

Figure 4:
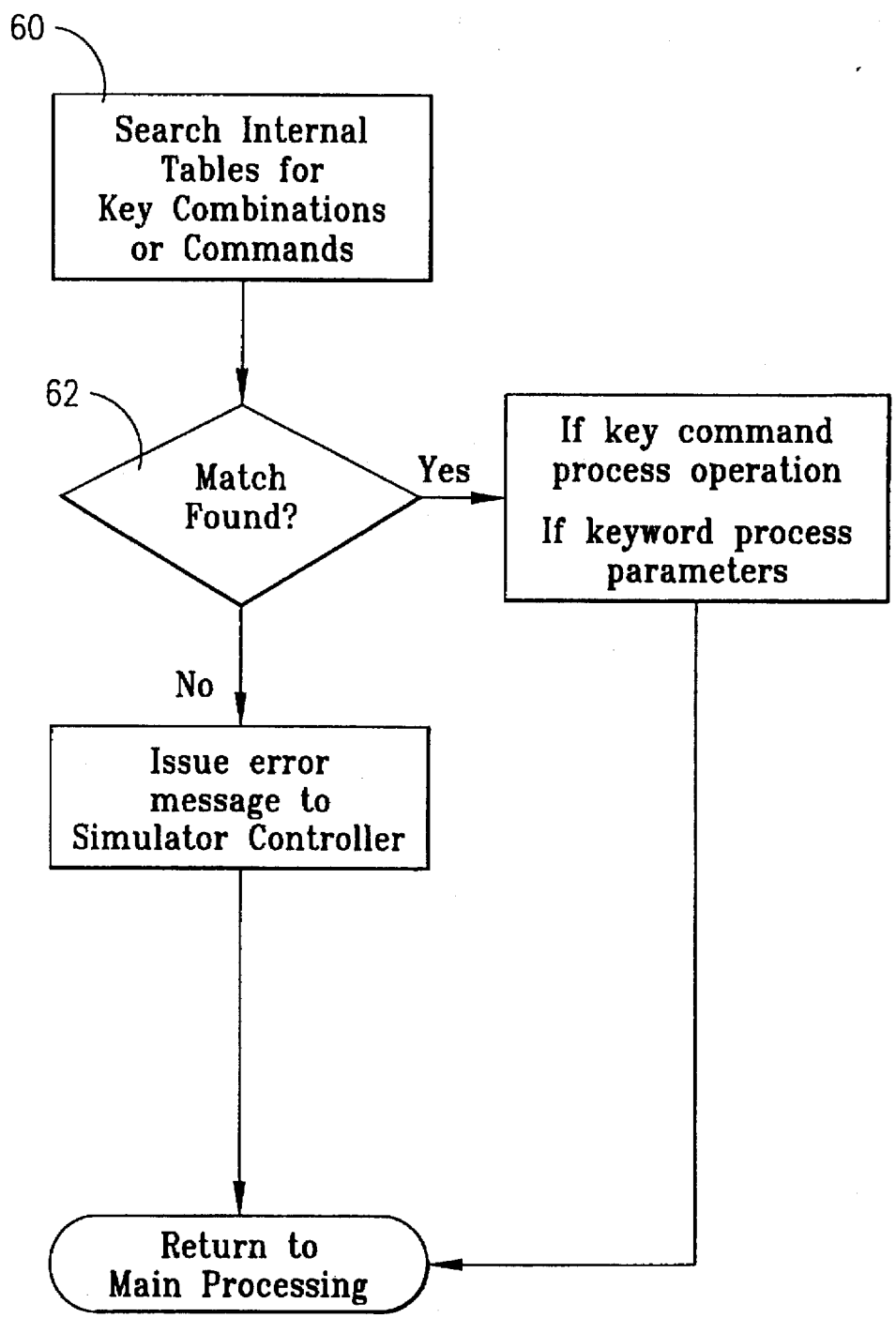
FIG. 4 is a flowchart of the simulator command control processing of the computer console simulator.

The second step 24 of the main loop is to handle input from the simulator controller. A flowchart of this procedure is seen in FIG. 4. The input may be in the form of key word commands or key combinations as commands 60. In this case, the commands are read from the keyboard buffer and a search for the command is made as shown at 62. If the command is located, the associated code is executed 64. If no command is located and no match found, an error message is presented to the controller 66. This is similar to any other command interface. A return is thereafter made to the main processing loop.

Figure 5:
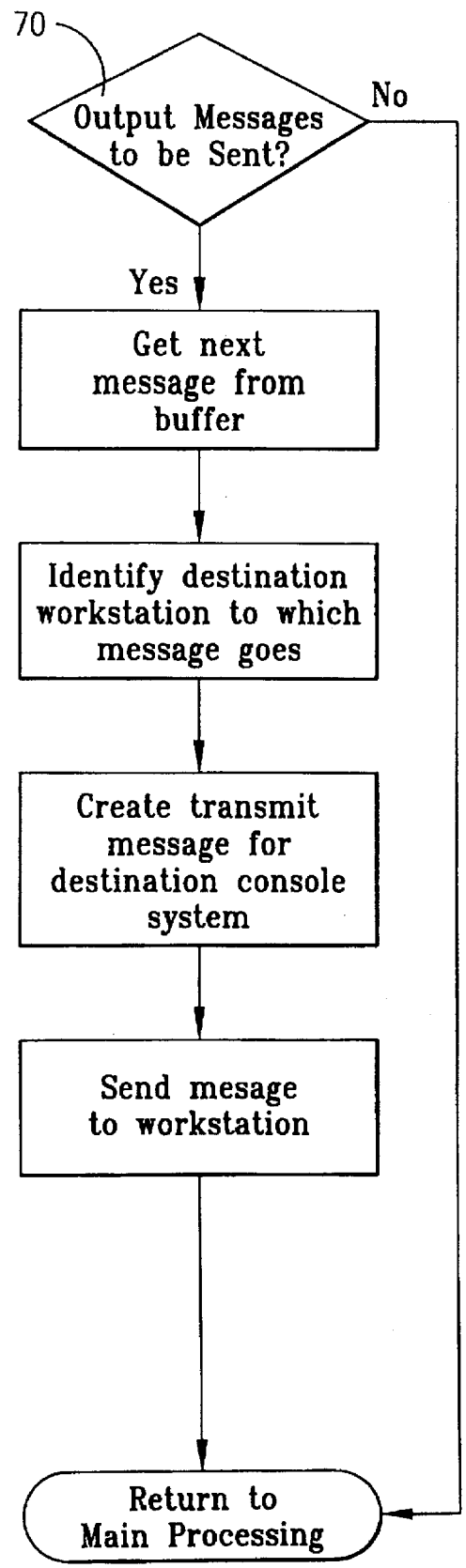
FIG. 5 is a flowchart of the simulator output message processing of the computer console simulator.
Figure 6:
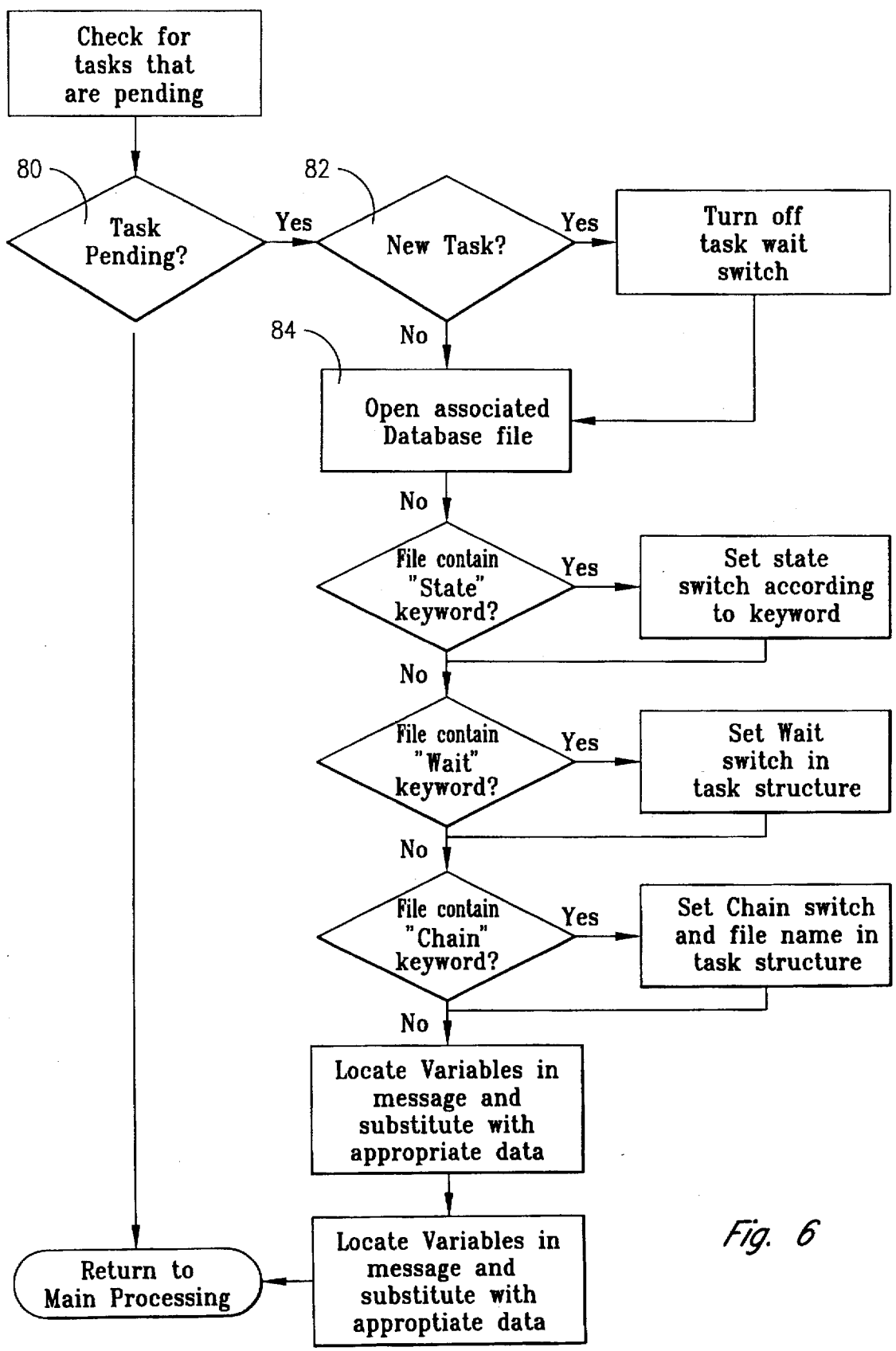
FIG. 6 is a flowchart of simulator task handling of the computer console simulator.

The third step 26 of the main loop is to check the output buffers. FIG. 5 shows a detailed flowchart. If output messages are queued to be sent as seen at 70, they are pulled from the buffer and examined for destination information 72.

Since the simulator is designed to run multiple simulations, the destination information is used to determine which communications interface to use in sending the message. Once the destination has been determined, the output is sent as shown at 74. This step is repeated until all output messages have been sent. Once there are no output messages to be sent, return is made to the main processing loop.

The fourth step 28 is a check of any pending tasks. These tasks are defined by the database files. Each task represents the processing that will take place for a simulator. That is, each task is used to control the internal state of the system being simulated. If a task is pending 80, the associated database information is scanned for the type of processing that must occur. A determination is made whether it is a new task 82. If not, the associated database file is opened 84. The internal variables associated with that task, including system resource simulation variables, are updated according to the task description. This may include items such as incrementing resource counters or generating system status messages (unsolicited messages). Once all outstanding tasks have been handled, the new status of the simulated systems may be presented to the simulated workstations. A return is then made to the main processing loop.

The fifth step 30 is to process any internal system variables and counters for the simulator. A series of device counters is processed to reflect changes in the system.

Figure 7:
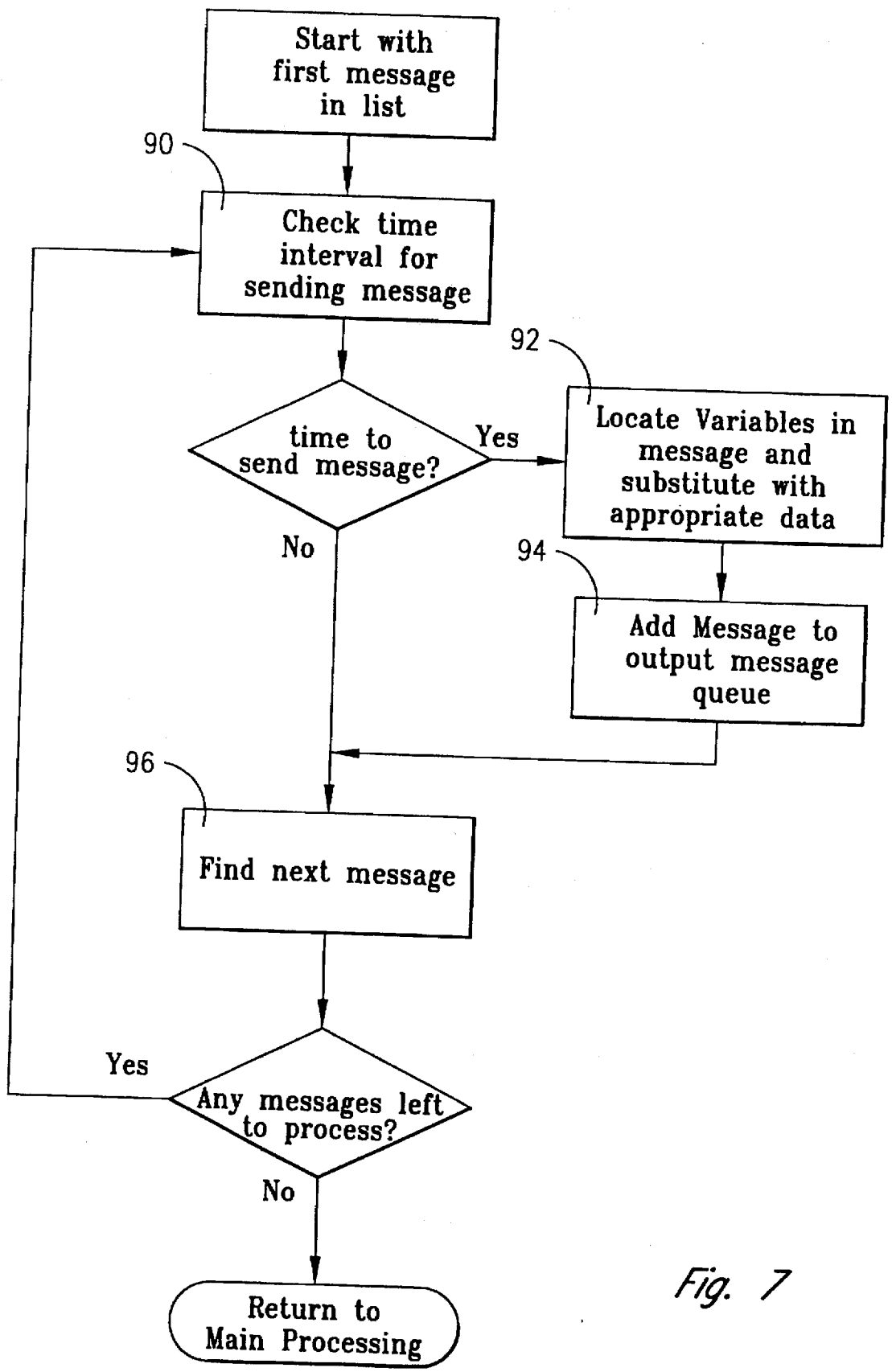
FIG. 7 is a flowchart of unsolicited message processing of the computer console simulator.
Figure 8:
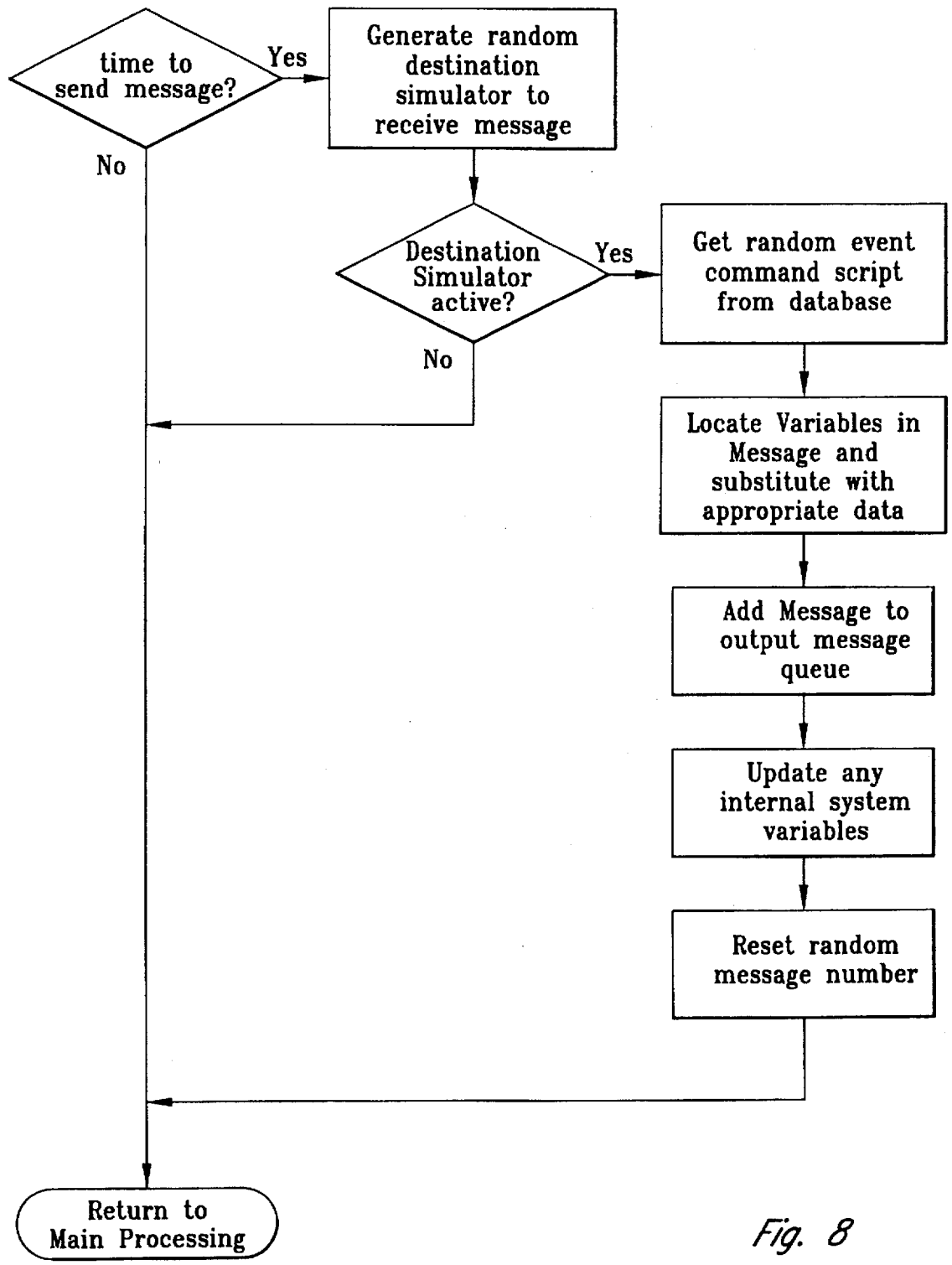
FIG. 8 is a flowchart of random event processing of the computer console simulator.

The sixth processing step 32 involves generation of unsolicited messages. These are messages that are generally issued by main frame computer systems without intervention by the operator. That is, they are not in response to operator input. These messages are usually generated by changes in the state of the simulated system as caused by processing the simulator task database. These changes may need to be reflected to the workstation operator or simulator user. A flowchart for this process is shown in FIG. 7. The first step is to check the unsolicited message database for messages. Each message is checked to see if it is the proper simulated time 90 to send it. If it is, the variables in the message structure are filled in and the message is placed on the output queue 92. This message will then be added to the output message queue and sent to the simulator workstation in the next pass 94 of the main loop. This procedure will be repeated to determine if there are other messages 96.

The final processing step 34 involves processing random events. This procedure is shown in detail in FIG. 8. A random event is one that is not scheduled and has a certain probability of occurring. For example, there may be a 10% probability of a crash occurring. The random event list from the database is searched for an event that should occur (this may be defined by specifying the event probability and time frame). The processing of the random event may alter the simulated system's state (for instance, a crash) and cause output messages to be sent to the workstation operator.

Lastly, the main loop is to check for the end of program as shown at box 36. If the simulator controller has issued a command to end processing, the main loop will terminate and the simulator process will fall into the exit and cleanup code. This code will close all communications connections, all open files, and exit to DOS as depicted at box 38.

Alternatively, if the end of the program has not been signaled, processing returns to the beginning of the main loop. The communications interface simulator processing may take a variety of forms. Since there may be multiple types of interfaces to the simulator, including Local Area Network connections and/or RS-232 communications connections, discussion of the handling of these interfaces has been left out. The actual processing of the simulator-workstation communications interface would be standard interface code, either for handling RS-232 communications or LAN conductivity and not part of the invention.

In summary, the console simulator will simulate an environment for training operations personnel and for testing automation.

Multi-Console Management System

The present invention allows multiple computer consoles to be operated from a single workstation implementing a multi-host console management system. This system will include support for connectivity through Local Area Networks ("LANS"), through local RS-232 connections, and dial-up support through modems. Support is also included for automation, for multiple computer console connections, and support for remote device control. Additionally, the ability to store and maintain information locally (such as copies of console logs), maintain and display system status information, and manage internal resources are included as necessary support features.

This system may use extended/expanded memory control software under the known Intel-Lotus-Microsoft standard, such as Dos Extenders by Phar Lap, and expanded memory managers from Quarter Deck or Microsoft, to allow access to memory unavailable to the normal Dos operating system.

Definition of Terms

Host: The console host is the software within the console management system responsible for a computer console. It may also refer to the computer system itself. In the case of connectivity across a local area network or LAN, the term "host" is used to specify the routines responsible for communicating with the computer host (see definition of NODE). The terms are usually specified as console host and main frame host.

Kernel: The term "kernel" is used to refer to the innermost core of a software system process. The routines that make up the kernel are used to handle all other operations of the system. In this process, the kernel is a management routine that is used to control other subprocesses in the system.

Memory Pages: A memory page is a "chunk" of memory used by the system. The size is defined by the system. The software system breaks the memory into memory pages of a specified size. These pages may then be handled as units and brought in and out of memory as needed. When a page is not in memory it will reside on a peripheral memory device such as a hard disk drive. The system may read and write the memory pages to and from the hard drive. This allows the system to make the memory available appear larger than it really is by keeping unneeded pages on the hard disk drive.

Node: A node refers to a machine running the console management system. Each copy of the console management system may communicate via LAN technology and may also support multiple computer consoles. To distinguish between the machine running the console management system and each of the computer connections, this document uses the terms node and host. The node identifies the physical machine and the host is the logical connection to a computer console.

Remote devices: Remote devices are electro-mechanical devices that may be run remotely. These devices may include switching mechanisms for turning devices on and off, sensing devices relaying information about temperature or pressure, or devices such as smoke detectors or alarm sensors. These devices are used to operate some type of physical action using electronic controls.

Window: A window is an area of a physical video display monitor dedicated to the display of certain information. In the case of this invention, the windows use borders to delimit text fields. These fields may be formatted messages from a computer console or status information to be displayed. The windows are dynamically controlled by the software process to display the information. They may be opened, closed, or resized according to the software.

Task: All of the processing done by the multi-console system is done in a series of small tasks. Each task represents a different function of the process. These tasks are controlled by a multi-tasking kernel. The kernel (or task manager) is responsible for insuring each task is given time to perform its functions. Some of the major task functions include handling the actual monitor display, handling communications with an MS-DOS operating system, updating and maintaining console queues, handling and directing operator input, and various other items. This tasking insures that all processes are constantly executed and no one item controls the system. This is critical in running a multi-host system, in that each computer host is running independently of the others. This multi-tasking system insures that each computer host is served in a timely manner.

Each of the computer host consoles is displayed in a window on the multi-console display. The information displayed is taken from a display queue that is maintained by a host display task. This queue contains messages to and from the computer host. This queue gives the operator the ability to display previous output from the host computer. All new output from the host computer is placed in this queue for display (The information is also written to a separate "flat" file known as the console log file. These files are kept on the local hard disk and there is one for each day and each console being monitored). There are other windows that may be associated with each host console. These windows display information that may be separated from the host computer output by user defined criteria. These are also windows that display system status and connectivity along with windows that may be accessed by operator automation packages.

The multi-console system may be connected to hosts in several ways. One is through a well-known IBM standard 3270 coax emulation. Another is through proprietary hardware. A third is through known third party protocol converters that convert output from a host computer into a common data stream. These different types of connections may all co-exist in a single multi-console unit.

The multi-console process supplies file maintenance utilities to allow the copying of console log files, automation programs, and other support files. File utilities include a file viewer, copier, and file deletion system.

The process implements a set of commands that may be used to initialize the multi-console environment and to control it while it is running. These commands include functions to describe connectivity to a host (i.e. whether it is a 3270 type connection), how many computer hosts will be monitored, how many will be displayed (the computer console queue files may be maintained without actually being displayed on the multi-console display), and several internal controls. These command structures are also used to control the operator automation system, LAN connectivity, and file maintenance system. They can also be used to set up and control remote device controls.

The process will interact with Local Area Support routines for implementing connectivity to other copies of the console management package. This allows a remote copy of the console management package to access the host computer console through a LAN connection to a locally connected copy of the system.

There is also support for communicating with remote device control systems. Information from these devices will be passed to the automation interface, and control information may be passed back through the same interface. This allows the system to remotely control physical control devices.

The internal processing systems will be covered in the next section.

Tasks

Most of the tasks run under the task manager kernel; however, some of them are interrupt driven. When a task is interrupt driven, it will be invoked by an interrupt, such as that caused by the hardware clock, update specific information, such as internal clock counters, and exit back to what it was doing before the interrupt. These tasks run independently of the task manager system; however, the data fields they update are used by other tasks running under the task manager. The description of these tasks will specify whether the task is interrupt driven or not.

The COPY task is used as an interface to the MS-DOS operating system to copy files between devices. This task allows the file copy process to be multi-tasked. This task keeps track of each file to be copied, where it is to be copied to, and how the copy is progressing. It will give control to MS-DOS to read or write a block and return control to the task manager. Since MS-DOS does not release control while it performs its operations, this allows the copy operation to be broken in smaller tasks and not interfere with the running of the console system.

The STAT task is responsible for collecting information about the status of the console management system. This task updates information for display windows that will relate hardware status, including status of any proprietary hardware, connectivity status, and information about system resources.

The KEYBOARD task is responsible for handling input from keyboard and routing it to the correct task. The keyboard input is routed to the host control task which in turn will route it to the appropriate main frame or handle it according to other options. The keyboard task works in two parts. The interrupt driven segment reads keystrokes from the keyboard and posts them for the keyboard task itself. The keyboard task then takes the key and acts on it. If the key is part of an input command it is added to an input buffer. When the enter key is received the input buffer is routed to the host control task. If the keystroke is a function or command key sequence, it is routed directly to the host control task. There is also a key sequence defined that will route an input message to all host control tasks.

There is a HOST CONTROL task, actually several related tasks, for each main frame console to be controlled. These tasks handle keyboard input, display window updates, main frame connectivity, automation connectivity, a remote RS-232 connectivity, and LAN connectivity.

The host control processes work in two directions, handling messages to the main frame and from the main frame. To handle messages going to the main frame, the host control system will get its input from either the keyboard, a remote RS-232 connection or from a connection via a LAN. This input is analyzed by the control process to see if it represents an automation command, a comment, or a host command. Comments are processed by adding them to the output display queue and dismissed. An automation command may be used to invoke or start an automation process. If this is the case, the control task initiates the automation task, establishing memory and communications queues for it, along with any other required resources, and attaches it as a task to the task manager. The automation routine may then run freely with direct communication queues to host control process. In the case of host command, it is passed to the appropriate main frame connection task.

The second direction of information is messages from the host main frame computer. If a message is received from the host it is added to the display queue after interrogation. The user may establish certain rules concerning the display of messages. These rules include whether the message is displayed in a certain color (message highlighting) or whether it will be displayed at all (message suppression). The message is then routed to any other queues that may require the information. This includes LAN and RS-232 connection tasks (tasks that allow for remote operation) as well as automation tasks that will use the message (these are automation tasks that are currently running in "background"). Other steps that are taken with the message include scanning it for automation responses. The host control task has the ability to initiate automation routines based on messages from the host main frame. Each message is scanned for a user and given a set of key words and acted on accordingly. The action may be to issue an immediate response or to initiate an automation process (the initiation is handled as described above). The host control may also route the message for printing and for logging on the hard disk.

From a console running connected via a RS-232 or LAN connection the process is similar except the message moves through the communications connection. The host main frame messages will appear through the LAN or RS-232 connection and be routed to the host control task, which will then be able to perform the same operations as a directly connected console system. The host control task may then route input messages for the host main frame back through the communications connection.

Other items attended to by the host control task is display of queue information, that is, the display of messages to and from the host main frame that are kept for redisplay. The host control task may be requested to scroll through previous console information. This is done by adjusting pointers within the display queues to point to previous messages. Pointers to the place to insert new messages from the host main frame are kept separately, and new messages do not effect the message display. They are simply added to the queue and displayed when the operator requests.

A description of the support files is next.

Files

There are several types of files used by this process. Queue files help to manage the virtual memory system and displays. Log files are built to maintain console data for use outside of the system. Initialization files allow the user to customize the features of the system. There are also script files, automation files, and help files. These files are all kept as standard MS-DOS files, some with particular data structures, on the local hard disk.

The queue files are kept as core images of memory pages. That is, a queue file is a series of records taken directly from the internal queue pages. The queue management task is responsible for maintaining the internal queues and the queue files. As new information comes into the system from the host computer, the queue management routines update the internal queue pages. At this time, old pages, that need to be overwritten, are written to the queue file, allowing space for the new information. The queue index record is updated both in memory and on disk, and the new information is placed in the newly opened queue page. On a timed interval, all new queue information is written to the queue files to insure they are current. In this way, the queue files represent a large memory area of which part is duplicated in actual computer memory. This allows the internal queues to appear to have more memory than they actually do.

To implement this structure, a fixed length queue file is built on the hard disk and a map or queue index is built. This index is used to determine which pages may be removed form the queue entirely (the queue file is finite), which pages are currently in computer memory, and which pages are on disk. The index also keeps information about the oldest and the newest queue page, along with pointers for the current display (Using the scroll back capability, operators may look through the entire queue, including pages copied to disk. In this case the display pointer would not be pointing in the newest page). If a new page is needed the old page is removed (the pointer is moved up in the list) and that page becomes the newest page. This circular format allows the scroll back capability to scroll through the entire queue while allowing updates to that queue to occur simultaneously.

The log files are standard ASCII "flat" files. That is, the data is kept in simple ASCII text form without any formatting characters. These simply contain the message from the host computer with a carriage-return and line-feed character at the end. These files may be copied from the hard disk and used directly by the user. Facilities within the console package allow the copying of files to occur without stopping the operation of the console system.

The initialization file is a special type of script file. Script files are simple ASCII text files that contain commands either for the console management package or for the host computer. In the case of the initialization file, it contains system startup and customization commands. This file is read and executed at start up.

The other script command files are simply blocks of commands that are to be sent to a computer host or to the console management system. The process allows these files to be opened and commands selected and entered, or for all the commands in the file to be executed at once.

The automation program files are, again, simple ASCII text files. These files contain instructions written in the automation language and are read into memory and passed to the automation interpreter. The interpreter is a controlled task running under the system.

The help files are ASCII text files that are simply displayed by the console system viewing facility. They may be called up at any time and displayed without affecting the operation of the console system.

LAN Interface

The Local Area Network ("LAN") interface allows host computer console traffic to be displayed anywhere a LAN can be connected. This allows multiple consoles to see and manipulate the operations console. This manipulation may be done through an automation package or through another operator interface (each of which must be running a copy of this console management product).

The LAN interface is an interface to the LAN Support routines (described in detail later herein). These routines are interrupt driven and, although initiated through the task manager, run independently of it. The communications interface works through a set of queues. There is a set of queues for each console host that will work with the network along with command communications queues. When a LAN connection is established between two console hosts, the console message queue is duplicated, allowing the LAN support routines access to the messages. These messages may be taken from the queue and sent across the LAN by the LAN support routines and placed in queues on the opposing side. Input messages use a similar queuing mechanism to send input across the LAN. It is the responsibility of the LAN support routines to maintain and operate all LAN connections.

It is the responsibility of the console management package to verify input and security. This is done through the automation interface. Input is given to the automation interface to be verified before being placed in the LAN interface queues.

The LAN interface also shares an identification table with the multi-host console system. The system uses this table to present possible connections to the operator. The system formats each of the connections by its "name" (this is information available from the ID table) and node identification into a table that may be displayed by the operator. The operator may chose one of the hosts from the list or the Disconnect command, which is also in the list. The choice the operator makes is formatted into a command and passed to the command interpreter.

The command interpreter executes the command which, if a connection command is issued, will establish a connection through the LAN. This first entails checking to see if a connection for the console host already exists. If it does, a message is sent to the LAN support package to disconnect the session. After the session is disconnected, the command interpreter sends a message to the LAN support package to establish the new session based on the ID information. The console system then establishes the appropriate queues for the console host to communicate with the LAN package. In the case of a disconnect request, only the first part of this procedure is followed. If the host console has no connection, only the second part of this procedure is followed.

The LAN support routines also share a global memory area with the console system. This area is used to store global variables for automation packages. When values are updated, the LAN support software will insure that the information is passed to all other nodes on the network so the variables on other machines will reflect the change. These global variable areas are set up and maintained by the console system; however, they are not used directly by the console system.

Remote Device Control

The console system also provides a communications link between control devices and the automation package. These devices may be smoke or fire detectors, remote switching devices, or other types of remote control/sensing devices. The information communicated through the devices may be through standard RS-232 interfaces or through third party hardware. The console system provides a task that receives information from the control interface and places it in a queue for retrieval by the automation package. This package may operate on the value itself or supply it to the network through network globals. The interface to the automation package will also allow data (or commands) to be sent to the remote control devices. The console management system will be responsible only for maintaining the communications path to the devices.

FIGS. 9 to 13 illustrate the multi-host console management system.

Figure 9:
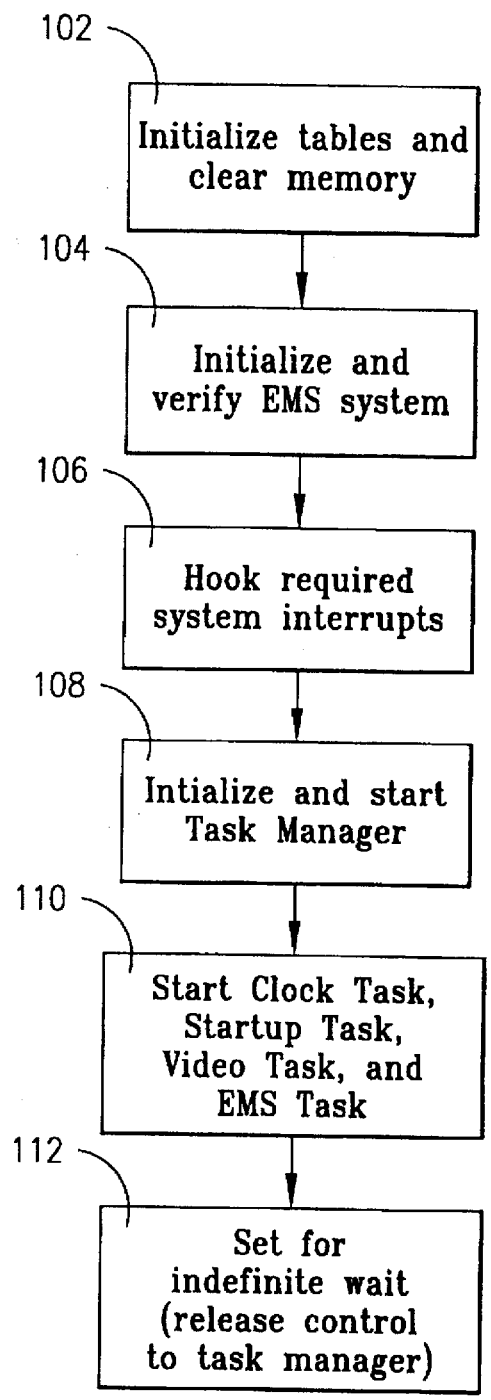
FIG. 9 is a flowchart of the start-up sequence of the multi-host console management system.

FIG. 9 illustrates a flowchart 100 of the program starting sequence. The first three steps of the system startup involve initializing program work areas and are standard, known processes. All internal tables and memory areas are cleared as shown at 102. The EMS (Expanded Memory System) interface is initialized as shown at 104. This interface conforms to standard EMS specifications and is primarily used to store display queues.

The third item initialized is the system interrupts 106. An interrupt may be brought about in various ways, such as hardware or software—for example, a hardware clock interrupt. The startup sequence "hooks" several DOS interrupts. By "hooking" the interrupt, it allows the console management system to process the interrupt first and give control to the DOS system only if needed.

The next step of the startup processing is to initiate the task manager kernel as shown at 108. This kernel is responsible for the console management processing. It will control each of the task operations within the system.

Once the task manager kernel is started, the startup routine adds several tasks to the task queues. These tasks include the Clock monitor task, the Video driver task, EMS interface task, and a startup task that will continue the rest of the startup procedure as shown at box 110.

The CLOCK task is interrupt driven. This task Updates the clock counters. These counters are later used by the task manager to check on the wait condition of tasks and by other tasks for general timing functions. The EMS task handles memory management in the Expanded Memory System. This task is responsible for handling memory management. It is used to copy information from upper memory, expanded memory (for information about Expanded and Extended memory, refer to the known Lotus-Intel-Microsoft standards), or from the hard disk, into the areas accessible by the running tasks. The description of Queue files in the files section discusses the virtual memory management. After all the tasks have been added, this startup routine relinquishes control to the task kernel as seen at box 112. Once the kernel has control, it will start running the tasks that have been added. It will not be returned to the starting sequence.

The last major task is the VIDEO task. This task is responsible for the actual display on the video console. It can be specified to run in display modes of varying sizes and must handle window placement and display accordingly. Any queue that is used for display, host console queues, status message queues, special message queues, etc., are handled through the windowing process of the video task. Each of these queues has a window descriptor. The video task checks each descriptor and displays information accordingly. The descriptor tells the video task whether the window is opened or closed (closed windows are skipped by the video task), where the window is to be displayed on the screen, how large the window is, and where the display items may be found. The window also describes how it will be displayed, including the window border type and the window background. The display items are a list of information to display. These items may be in a queue, in which case the video task displays as many items as will fit in a window, or a static display, as some status displays are. The items may also be a title item which will be displayed in the window border. Each item contains information about what color it will appear in the window, where it will appear in the window, and the information that will be shown. In the case of message displays, some of the item information is missing and the video task calculates the required information. In the case of status information, all the information will be available and the video task simply places it.

As the video task goes through the window list (and items) it builds a display screen. Certain windows will take precedence over other windows, and their information will overwrite previous information. The video task is continually updating the display screen, even if there are no changes. If there are changes, they will be reflected as quickly as possible. Each of the other tasks is responsible for handling its window information and items. The video task is responsible only for displaying them on the video monitor.

Other tasks are described in the definition of terms.

Steps 102 and 104 of processing involves initialization of the internal tables, the expanded memory interface, and display areas. At this time the hardware devices are polled and identified. This includes any 3270 emulator terminal hardware, RS-232 serial communications ports, and any other hardware (when running with proprietary hardware, this step will identify that hardware and cause it to initialize). Examples would be communications interface hardware for other data gathering system. The startup sequence also builds the task queues and starts the task manager. Upon completion, the startup process places itself in a permanent "sleep" state. That is, the task manager will ignore it as a task. At this time, the task manager is the central control of the system.

Once the system is started, one of the first tasks to run is the initialization task. This task reads the initialization file and processes the commands in it to initialize the system. These commands are passed to the command interpreter task and executed. They are used to customize the console management system. The commands are used to define hardware configurations for the proprietary hardware, establish names and connectivity for each of the console hosts, and other such customizing operations.

Once the system is initialized and verified, the tasks that operate the computer host management are released as shown at box 112. At this point, the main tasks collect messages from host computers and send input to them. There are other tasks that are running at this time as well; however, the heart of the system is to display computer console information and allow operators to input commands to computers.

Figure 10:
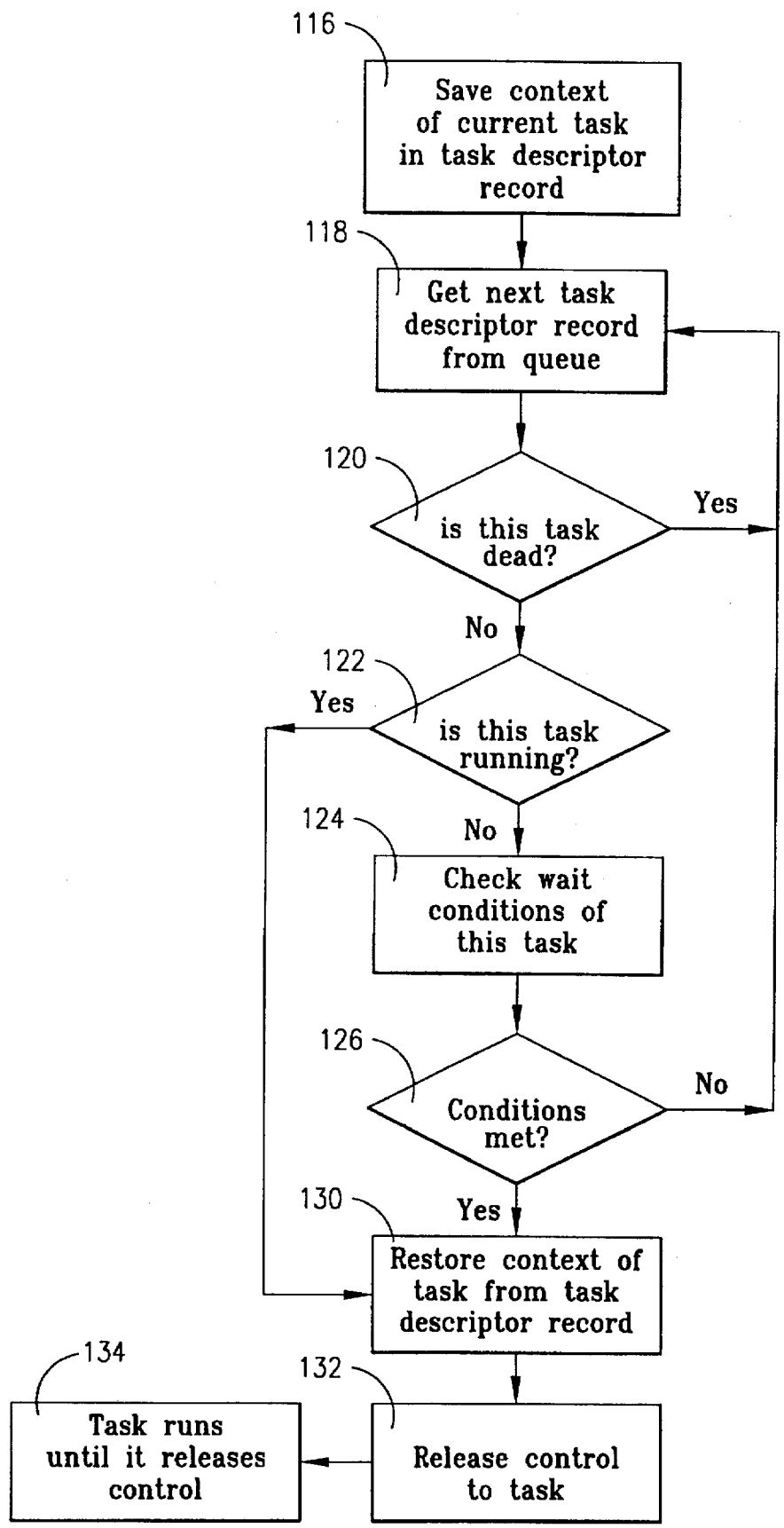
FIG. 10 is a flowchart of the task manager sequence of the multi-host console management system.

FIG. 10 illustrates a flowchart of the task manager kernel 114. The task manager or task kernel is a round-robin task manager. The task manager or kernel is a "round-robin" task dispatcher that controls all the internal tasks of the process.

Each task is assigned a task record that keeps the state of the machine for that task, along with a set of task flags. These records are kept in a circular list. The task manager locates the next task record on the list, interrogates the task flags in the record, and handles the task accordingly.

Each task may be "running", "waiting", or "dead". If the task is found to be running, control is given to it by the task manager. If the task is "waiting", the conditions of the wait are checked. If they are met, the task is given control, but if they are not, the task is skipped. A "sleeping" task is one that is in a wait state with no conditions. This task will never get control. A "dead" task is also a task that will never get control.

The task record contains information about the context of the microprocessor at the time the task "waited". When a task issues a wait, the task manager stores the state of the microprocessor including the registers, program pointer, stack pointer, and flags in the task record. This is referred to as storing the context of the task. The task manager then loads its own context and proceeds to look for the next task. When it is found, the context of that task is loaded and control is returned to the next step in the task after the wait. This creates a non-preemptive multi-tasking system. However, there are some cases when a task must be preempted. The task kernel has a second part to handle this situation. A routine based on the clock interrupt checks the current running task to see if it is spinning (not releasing control). If this check routine determines that the task is spinning, it is flagged as a "dead" task and control is returned to the task manager. If the task is not spinning, control is returned to the task. The clock interrupt comes at a regular interval and allows checking of the tasks. Flagging spinning tasks as dead effectively kills the task as the task manager will no longer give control to that task. This processing is entered when called by a running task. At that time the running task is suspended and the task manager will find the next task to run, set that task's context, and give it control. This process is followed throughout the processing.

The flowchart 114 starts at the point a running task gives up control by calling the task manager (recall FIG. 9). The first step the task manager takes is to save the context information of this task as seen at box 116. The context information of a task includes the current values of the hardware registers, the task's stack, and other items regarding the current state of the task. These items are stored in a task descriptor which is in a circular queue.

The next step is to go to the next task in the queue as seen in box 118. Each task is assigned a task record or descriptor that keeps the state of the machine for that task, along with a set of task flags. These records are retained in a circular list. Since the queue is circular, the suspended task will eventually be seen again. The next task in the queue will then be located and interrogated. This interrogation involves checking to see if it has been suspended due to an error, in other words, is the task 'dead', as shown in box 120. If the task is dead, the next task in the queue is interrogated as at 118. If the task is not dead, the interrogation continues.

The next interrogation is to see if the conditions to run the task are met. These conditions include waiting for time intervals or other events. Also, the task may have simply released control (it is running as shown at 122) and not be waiting on any event. If the task is not running, a check is then made, as seen at 124, of wait conditions. If the conditions have not been met, the task manager continues back to the next task in the queue as seen at 118.

When the conditions are met, shown at box 126, and a task is found that should be given control, the next step of the task manager is to restore the task's context 130. This involves reloading its registers, stack pointers, and other items into the system hardware.

Once the context has been restored, this new task is given control 132. This task will then process or run at 134 until it relinquishes control, either to wait for an event, or to simply allow other processes to run.

Each task is designed to release control by "waiting" to allow other tasks to process. When a task waits, it returns control to the task manager, which will look for the next task to release. The wait may be unconditional, in which case the next time the task is found it will be given control, or it may be conditional, in which case the task manager will check the conditions before relinquishing control. The wait condition is based on a time interval. If the time interval has expired when the task manager checks the task, the task is given control. If the time interval has not expired, the task is skipped.

This task management process runs continuously for as long as the console management system runs. Except for the interrupt routines, all processing takes place under the direction of the task manager.

Figure 11:
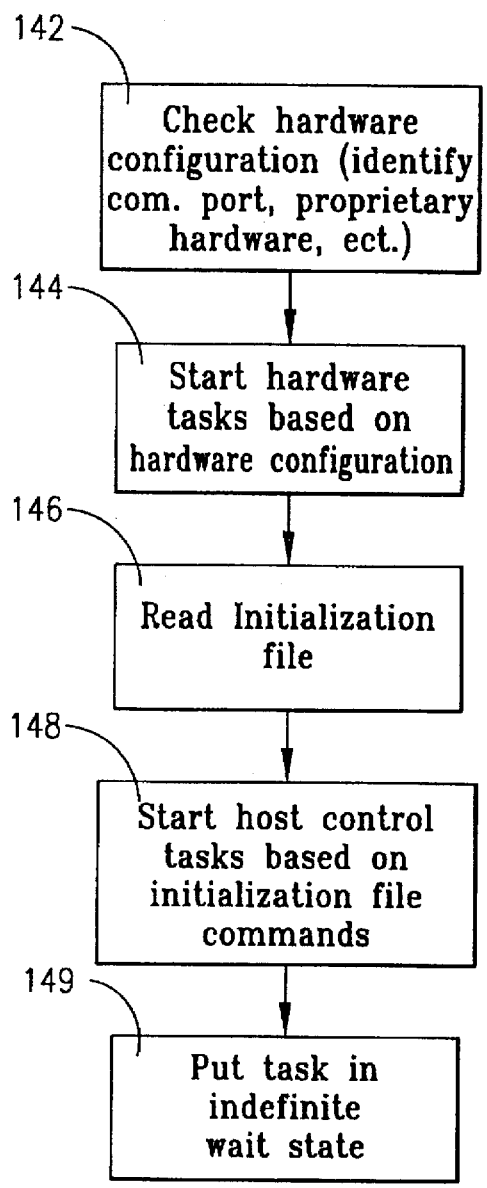
FIG. 11 is a flowchart of the start-up task sequence of the multi-host console management system.
Figure 12:
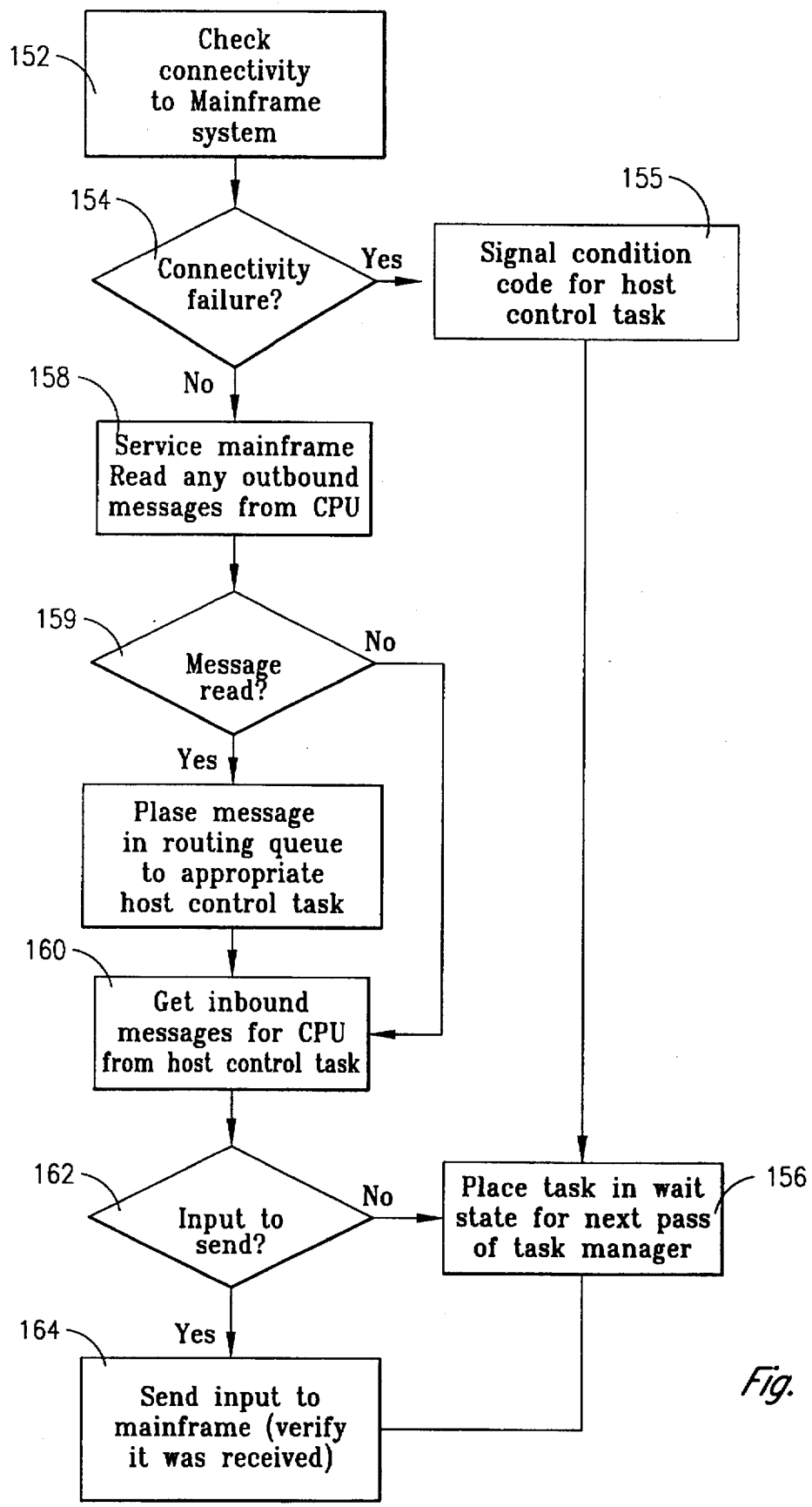
FIG. 12 is a flow chart of the main frame connectivity tasks of the multi-host console management system.
Figure 13:
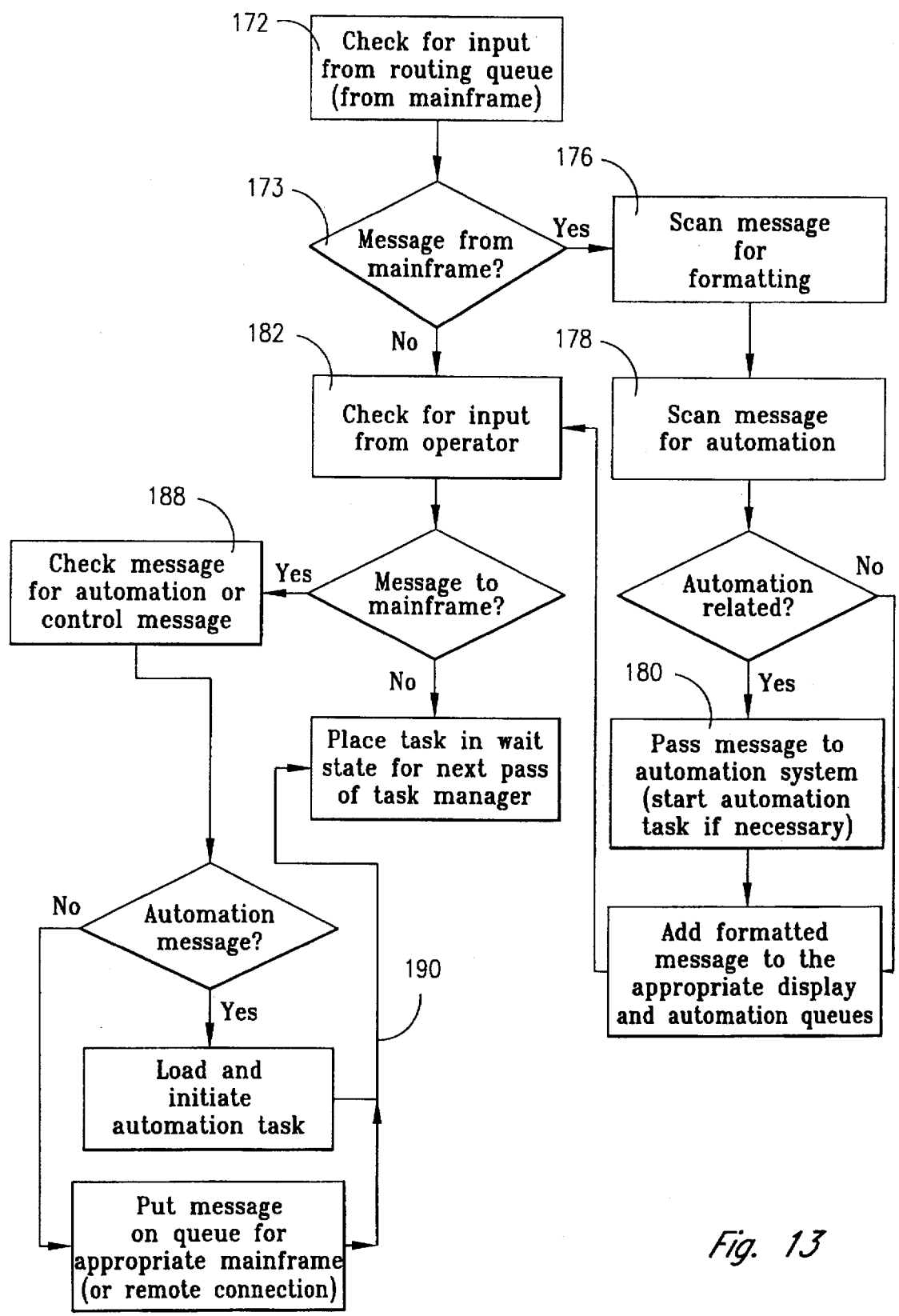
FIG. 13 is a flowchart of the host control tasks sequence of the multi-host console management system.

FIGS. 11, 12 and 13 illustrate types of tasks. FIG. 11 illustrates a flowchart 140 of the startup task. The startup task is one of the first tasks given control by the task manager. This process is an extension of the main startup routine described in FIG. 10. This startup task is responsible for checking all system hardware, connecting communications paths, and handling any other startup processes dictated by the initialization files. Once all this processing is completed, this task will place itself in an indefinite wait state.

The first step of this startup task is to build a table of the existing hardware within the workstation as shown at box 142. This includes checking for proprietary CPU hardware that is being used by the console management system. With this hardware list available, connections between console display tasks (to be described in detail with FIG. 13) and hardware interface tasks (to be described in detail with FIG. 12) may be made.

Hardware control tasks 144 are added to the task queue based on the hardware that was found.

The main processing of this startup task 140 is to process the initialization files as shown at box 146. This file is used by the end user to configure the console management system to its needs. This file is read from disk in the workstation by the startup task and the commands contained in it are processed. These commands may be used to change screen displays and other cosmetic functions, or they may be used to establish connectivity between hardware interfaces and console operation tasks.

Once the initialization file is processed and completed, the actual console operation tasks are started 148. These tasks are configured by the initialization file(s) and the tasks are connected to the hardware interfaces. At this time the console interface system is running and available to the end user.

The startup task may then add other tasks to the task list including automation routines and LAN support routines. Once all the new tasks are added, the startup task 140 is placed in an indefinite wait state as shown at 149.

FIG. 12 is a flowchart 150 of the connectivity task or tasks. The connectivity task(s) are responsible for the hardware interface between workstation and main frame computer and all other hardware. This hardware interface may be to a CPU host such as a main frame, a LAN connection, or a RS-232 connection. This connectivity task is responsible for moving messages from the hardware buffer areas to the routing system and from the routing system to the hardware for output. The buffer areas may consist of buffers set up by the hardware, as is the case with COAX connection hardware, or to program buffers set up through software, as is the case with LAN connections. A copy of this connectivity task exists for each connection.

The first step of this connectivity task 150 is to verify the hardware connections as shown at box 152. If a hardware failure is detected as at box 154, the appropriate tasks are sent messages. As an example, a message may be sent to the operator notifying that particular connection has failed (see box 155). This task will then place itself in a wait state 156 and check the hardware at a later time.

Alternatively, if no problems are found with connectivity, the task will check for input from the hardware interfaces as shown at 158. These interfaces may operate in an interrupt driven mode. In this case, the interrupt handler for that hardware will transfer the data from the hardware to a buffer area. This buffer area is managed by this task. If a message has been received as shown at box 159, it is routed to the appropriate console handling task.

The next three types of tasks are shown at box 160 and handle connectivity to main frame computers. These are the tasks that will control message flow to and from the main frame computer and the operations staff. These tasks are invoked by instructions from the initialization file. The initialization instruction specifies how the console management system will attach to a main frame as well as which internal host controlling task will be responsible for the operator interface.

The COAX tasks are used to handle 3270 emulator hardware. These tasks run under the task manager and there is one for each COAX 3270 emulator board in the system. These boards are used to connect to IBM 3274 control units as one of the connectivity requirements for the system.

The COM tasks are responsible for handling RS-232 communications connections. Again, this task runs under the task manager and there is a separate task for each communications line. This task may be used to communicate to computer consoles through a third party protocol converter. They may be used to communicate with other copies of the console management system for remote connectivity, or they may be used to control remote devices.

The LLB task is an optional task used to drive the proprietary hardware developed for this product. This hardware is not a requirement of the console system. This task was implemented specifically for this special CPU connecting hardware. The hardware may control connections to multiple main frame systems and this task must be able to associate each connection with a separate host control task. This task must also support the proprietary hardware as well, recognizing and handling problems that may occur with that hardware.

These three tasks may all run on the same system allowing multiple types of main frame connections to coexist. The basic selection of how connections will be made is done through the initialization commands handled by the startup processing.

This task then checks to see if any data has been received from the console task 160. If there is input to send, as seen at box 162, it is given to the hardware controller to be sent to the main frame as shown at box 164.

Once this loop is complete, the hardware connectivity task will suspend itself until the next time through the task loop.

FIG. 13 is a flowchart of the host control task or tasks, in other words, the console management side of the operation. There is a copy of this task for each console hardware interface running (as previously described in FIG. 12). This console display task interface is responsible for handling input and output to the operator. It will receive information from the routing task (which received it from the hardware task) and process the message. It will also send input commands to the routing task to be delivered to the hardware task. The console display task will return to the task manager after processing.

The first step in console processing 170 is to get data from the routing queue 172. The routing task takes information from the hardware tasks and routes them through the queue to the appropriate console task. A check is made whether there are messages from the main frame 173. If no messages are in the queue, this task jumps to the second step of checking for input from the operator.

If there is a message or data in the queue, it is retrieved and processed. This processing first involves scanning for formatting information as shown at box 176. The end user or operator may create files that are used to produce message formatting. These files contain information to be scanned for in a message. If the scan is triggered, the message will be formatted in a special color. For instance, a keyword in a message may cause the message to appear in a red color in order to alert the operator. Messages may trigger processing that removes the message from display. This scanning may also be used to trigger automation functions 178. This step will scan for matches within the host message and start automation program tasks if a trigger is found 180.

If the message is triggered for reformatting, the reformatted message is placed in the display queue. Otherwise the message is placed in the display queue for standard display.

After the messages have been scanned and added to the display queue, a second step begins. Operator input is then processed as shown at 182. Initially, this process checks for automation functions 188. If the input is to execute an automation function, the automation program is started as another task 190 and the console task suspends itself. If the input is not an automation command, it is passed into the routing queue for the appropriate hardware handler task as described in FIG. 12. The host control task then suspends itself until another pass.

Figure 14A:
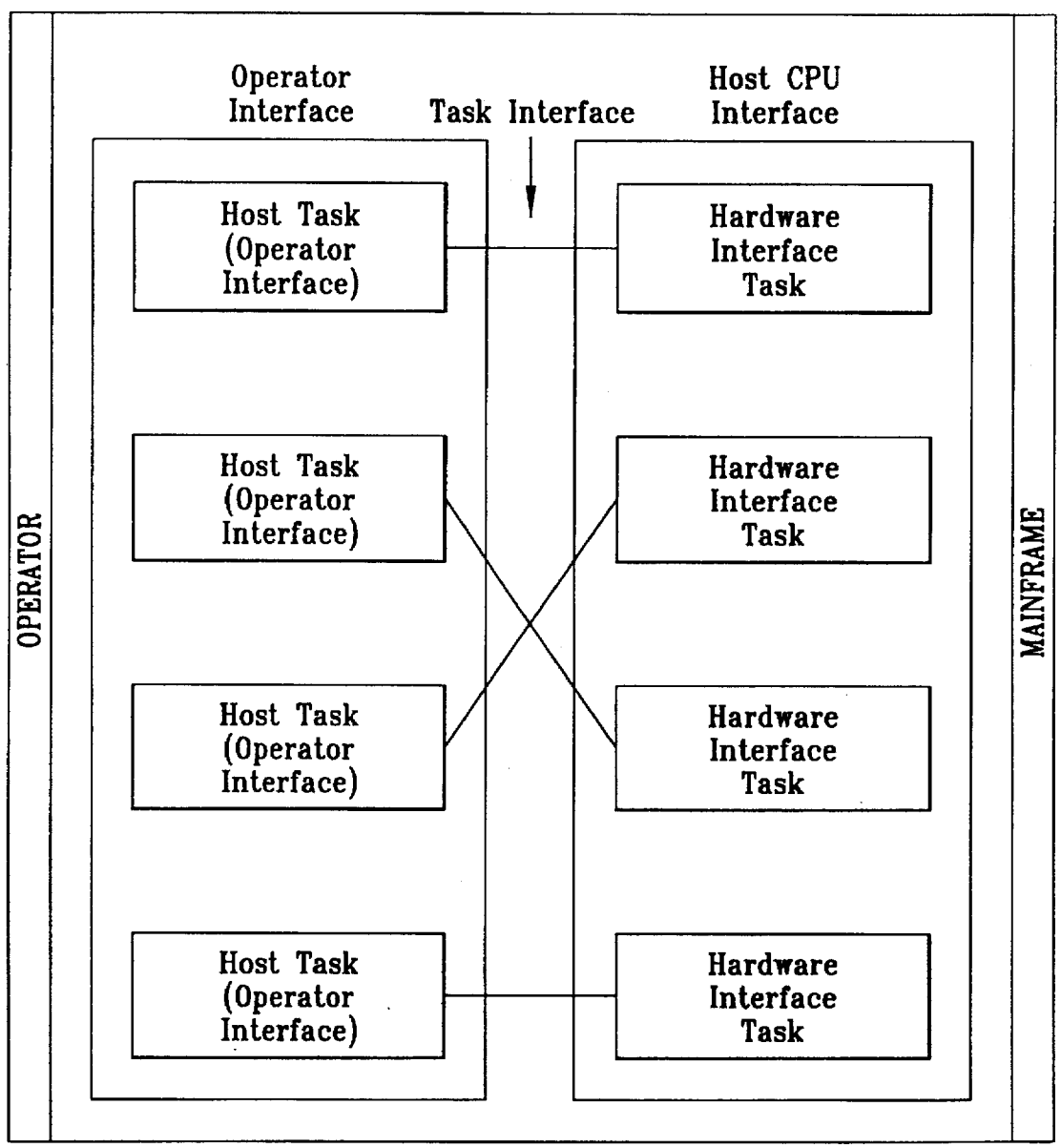
FIGS. 14(a) and 14(b) are a diagram of the system components of the multi-host console management system.

FIG. 14A is a diagram of the internal connectivity of the multi-console system. This diagram shows the internal connectivity of the console program. Each host task controls the screen display and the operator interface. Each hardware interface task controls a hardware (CPU, LAN, or other communications connection) interface. Any host task may be associated with any hardware interface. Each task runs independently and communicates through an internal queue. The routing of messages between a host task and hardware task is controlled by a routing procedure common to all tasks. The connections are established by commands entered by the user.

Figure 14B:
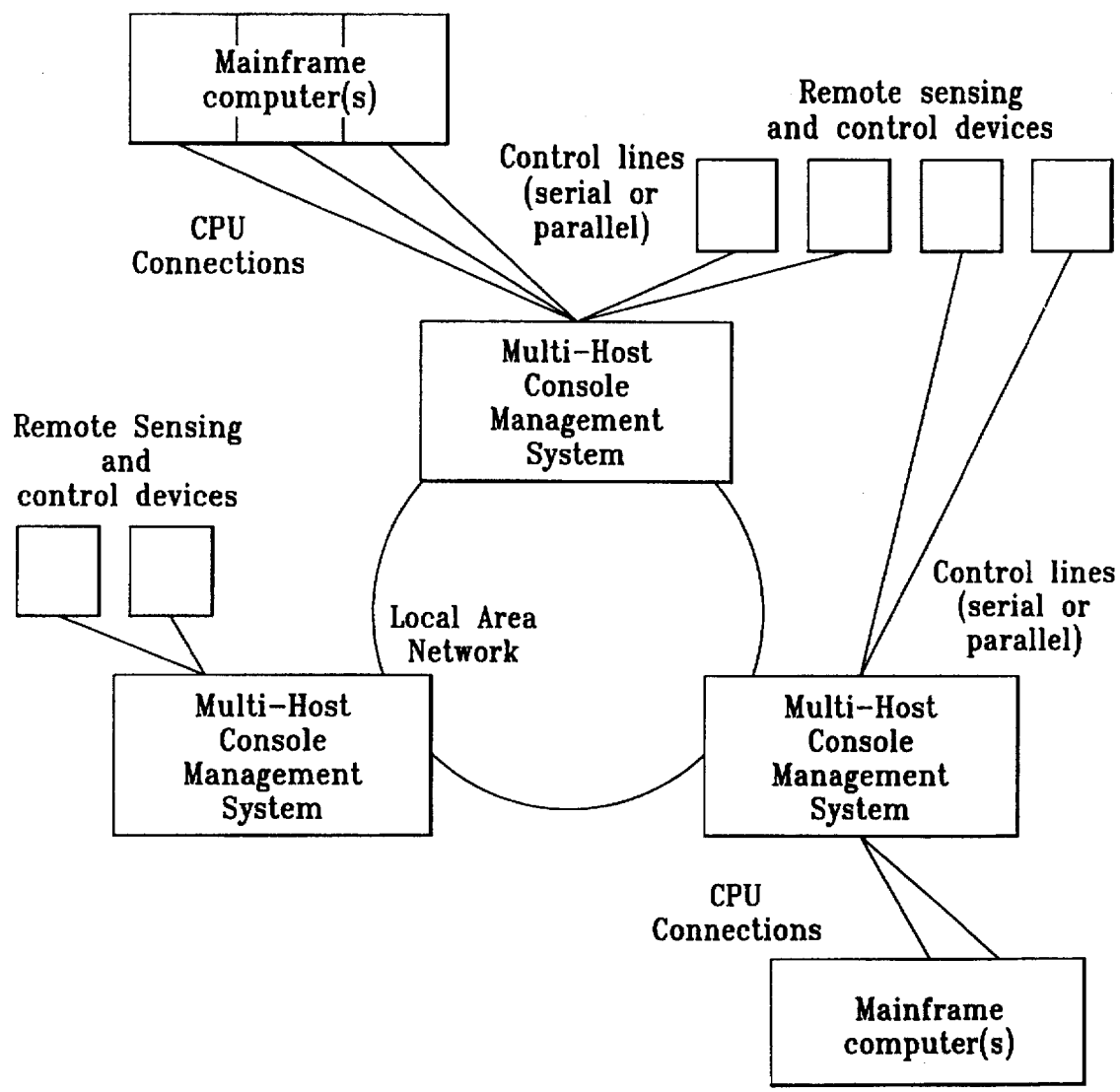

FIG. 14B is a connectivity diagram for optional remote physical devices. This diagram shows the attachment of physical control devices to the console management system. These devices may include temperature monitors, fire and smoke monitors, and other physical monitoring devices. These devices may be attached with parallel or serial control lines to either a console system directly attached to a CPU or to one connected on a Local Area Network. All data that comes from these devices will be passed around the LAN as needed and may be available to any of the console systems. In turn, any of the console systems may direct commands to the various devices either directly or through the LAN connections. Using existing known LAN technology, these devices may be operated remotely at great distances. The connectivity to the physical control devices will not affect the computer console processing.

The console management system will establish a communications interface with the control devices and with any automation system so that operation of the control devices may be automated. This allows the end user to use the automation features for maintaining physical environments.

For example, a control device might be a temperature sensor. The console management will be automated to turn off the main frame when a certain temperature is exceeded.

Figure 15:
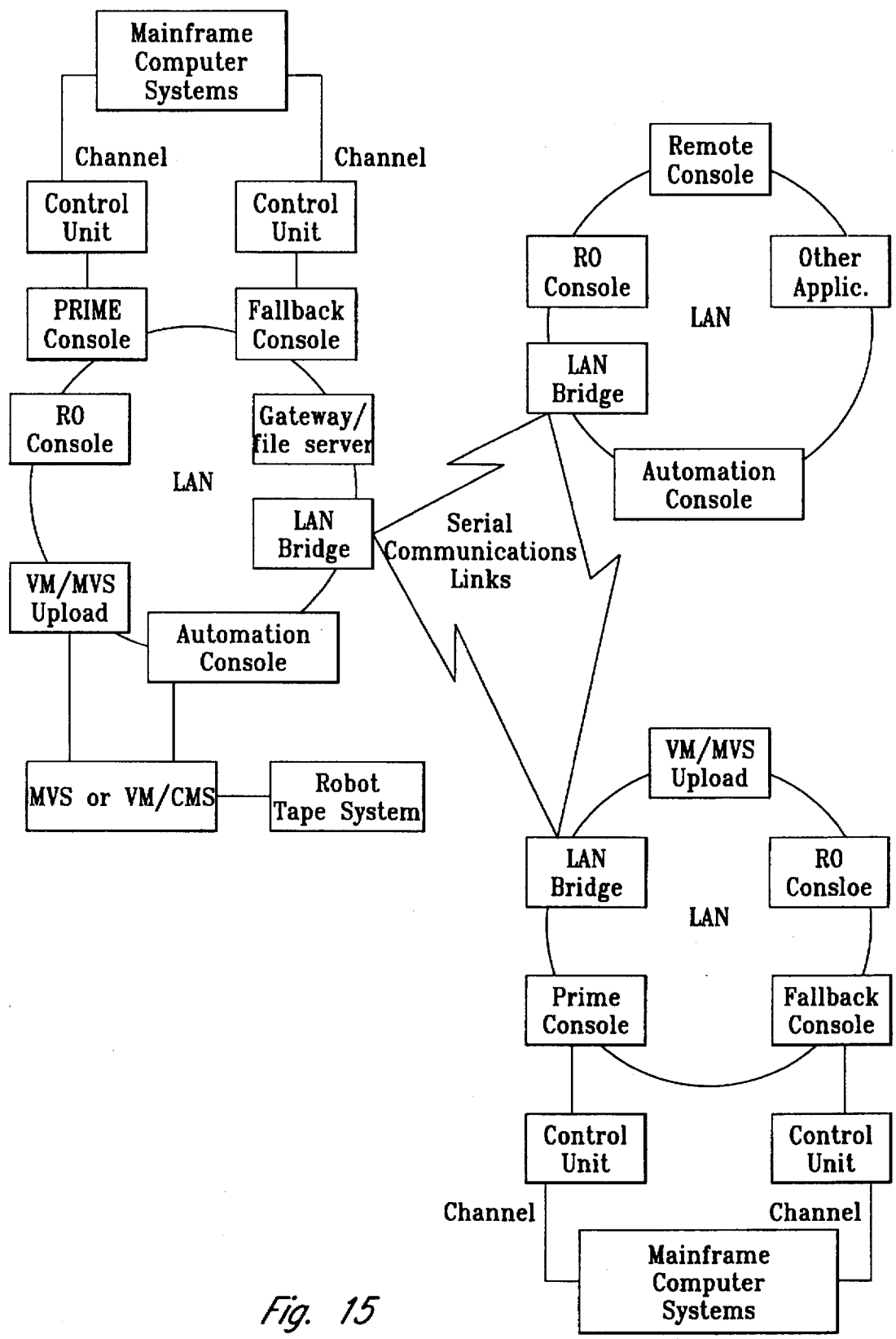
FIG. 15 is a connectivity diagram of the multi-host console management system.

Finally, FIG. 15 is a block diagram of the layout of one possible system employing the invention.

SUMMARY

The multi-tasking capabilities of this system allow it to update and service multiple computers in real time. These facilities also give the capability of handling automation tasks at the same time as handling consoles. There is support for remote operation of consoles as well as operation of remote sensing and control devices. This system provides a multi-console system with remote accessibility and operations automation.

Distribution of Main frame Computer System Console Information

Definition of Terms

Implementation of network communications requires special communications hardware, i.e. token ring adapters. The suppliers of this hardware will include special software to support these adapters that will also be required for the implementation. In some cases, additional third party network support software may be required to complete the network interface. For example, some manufacturers require the IBM NetBIOS support in addition to their own software.

Console management system

This refers to a software package used to connect to a computer. This software is used for the operator console. It may have programmable capabilities or be used for an operations automation system.

Host or Computer

Any large computer system that uses a central console for operations. The term Host is sometimes used to refer to the Console management communicating with the host computer (to the LAN support software described here, they are the same).

Multi-Console Management System

This refers to console management systems that may handle more than one operations console. These systems are used to connect to multiple computers and allow them to be controlled by a single point. These systems may also be programmable or have other automation capabilities.

PC Workstation

Refers to any microprocessor based machine running a console management system.

Source/Client

A Source is considered to be a console management system connected to a computer. A Client refers to a console management system connected to a source through a network using the process defined here. In the case of a multi-console system, it may be both a source and a client simultaneously. That is, some of its console displays may be direct connections to a computer and some of its connections may be through a network.

LAN

The terms Local Area Network or LAN are used generally to refer to network architecture supporting communication between PC work stations. This includes, but is not limited to, LAN and WAN (wide area network) technologies.

DETAIL OF INVENTION

The software process for maintaining a console network and allowing multiple users to access an operator console is broken into three major parts. The first involves the maintenance of the network, the second involves establishing connections between machines, and the third involves message transmission. This process also has two minor functions—the ability to maintain globally accessible information and the ability to create special consoles that will receive information from groups of operations consoles.

The first step of the process is to maintain network information. This process issues an identification record across the network at a given time interval. As one example, each workstation running a multi-host console system has unique identification information included on each host.

Every unit on the network running this process will receive the identification record. When the process receives an identification record, it will search its internal tables to see if the sending process has already been identified. If it has, the record is ignored. If the receiving process does not have any identification information for the sending process, it will update its table with the information. The sending process will also be responsible to issue a shutdown message to all other units on the network when it is being shut down.

A second part of this identification procedure involves its use with multi-console management systems. The identification information includes data for each console made available by the multi-console management system. That is, each console that the multi-console management system is connected to may be identified throughout the network.

The second step of the process is establishing connectivity. This includes connectivity with multi-console management systems. The process must work directly with these systems to be able to identify each console separately. This connectivity is done through a set of message queues-one written by the console system, the other written by the LAN support process. The lists kept by the LAN support process are also kept in common memory. These include the identification list (or connection list) and the global variable area. The connection list that is available to the console management system is a list of nodes on the network along with identification for each console handled by the node. If the console system requesting a connection is a multi-console system, it may establish connections to any node-console on the network. This allows connection between a single console to a single console or, single console systems to multi-console systems or, multi-console systems to single console systems or, multi-console systems to multi-console systems. The connectivity list simply supplies the console management system with the choice of a console to attach to, whether that console is a single console or part of a multi-console system.

To establish a connection, the console management system selects a source to connect to and the process establishes a "session" between the two systems. The concept of a "session" is defined in the Token-Ring Local Area Network specification published by several standards groups. The process is responsible for collecting information from both Client and Source and communicating that information. The information is passed to the process by either side and is placed in a transmission record. This record has sufficient information to identify the node and console from which it came as well as where it is going. The process then passes the transmission record to the LAN support routines. (These are third party routines and may be hardware dependent. This process is defined to be hardware independent). Upon reception, the identifying information is verified and the data passed to the appropriate part of the console management package.

The two minor functions of this process are the ability to move global information within the network and the ability to connect multiple sources to a single user. The first option gives the console management system the ability to maintain internal information about the status of consoles within the system without sending specific messages around the network. By establishing a global variable system, the process allows the console management system to change such variables at one node and have the corresponding variable be updated on all other nodes. This feature may be used extensively by automation packages to maintain system-wide status. The process monitors the value of each variable in the global list. If the value of one is changed, a message is sent to the next downstream node. This node is then responsible for updating its copy of the variable and passing the value further downstream. The value should eventually return to the original node. When the original node receives the message it will "know" that the update has taken place and stop the message. The identification records keep enough information to allow all the nodes to appear as a ring. The process will sort the identification records anytime a new node is added or deleted. This sorting insures that the ring appears the same to all nodes on the network and global updates will be processed by all nodes in the ring.

The second minor function that is supplied is to allow a user to be connected to multiple Sources. This allows an automation application to see events on multiple consoles and respond accordingly. This process is referred to in terms of this document as "bridging". One or more Sources may be bridged to a specific user. This is done by each of the sources establishing a separate, unique LAN session between itself and the user node. The process running at the client node uses the information in each transmission record to identify where the message came from. It is the responsibility of the console management system to send any reply with the appropriate destination identification information.

This process allows users to disseminate operations console information anywhere on a Local Area Network. This allows increased access to operations console information as well as allowing automation operations to be spread across a network.

Figure 16:
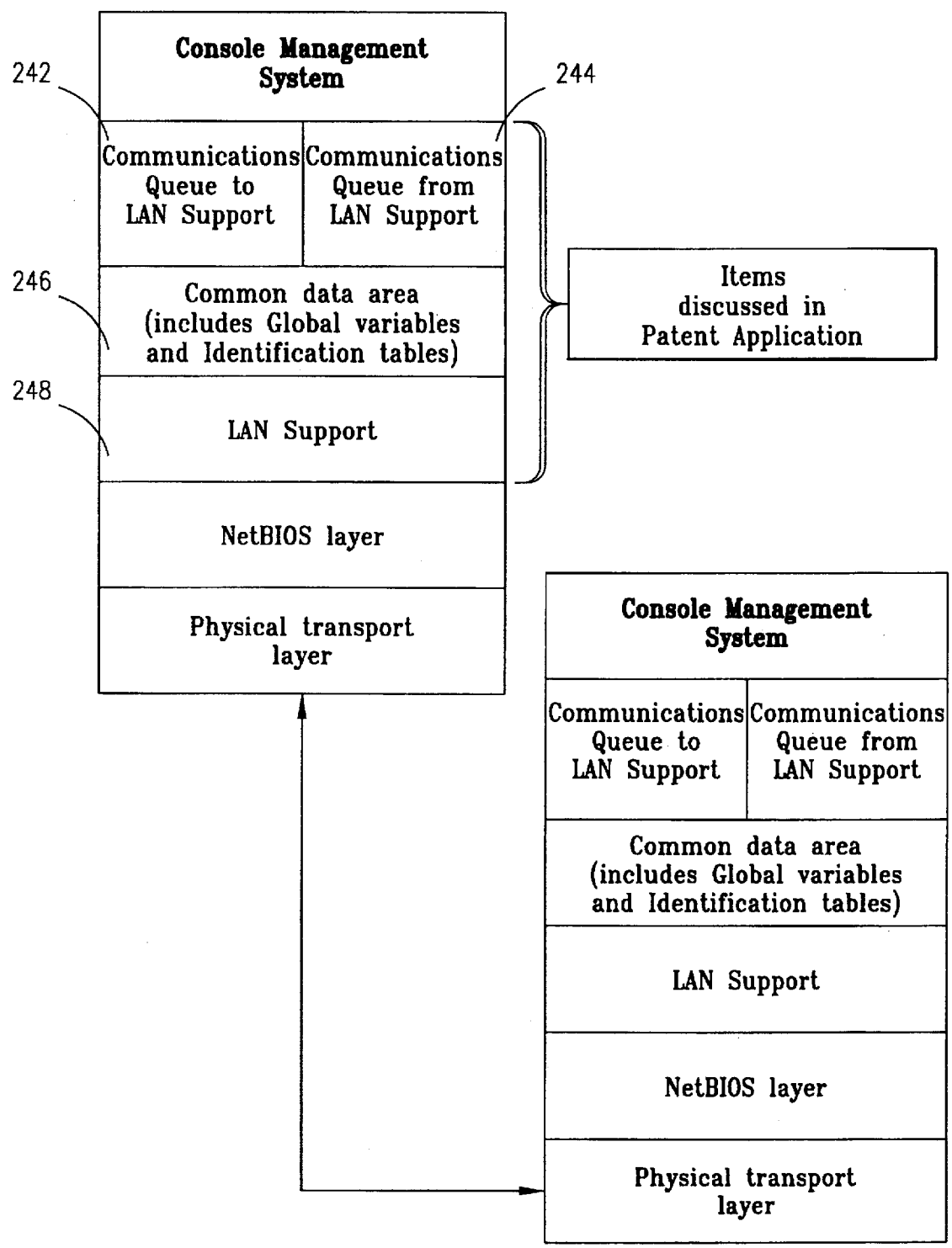
FIG. 16 is a block diagram of the distribution of management of a central processing unit to multiple users.

FIG. 16 is a graphical description of the distribution of management of a central processing unit to multiple users. The diagram shows where the LAN support routines operate. The support routines are used to communicate between the console management system and NetBIOS software. The NetBIOS software is used to communicate with the physical transport layer, this is the physical LAN board placed in a PC.

The LAN support routines includes (from top of the diagram) communications queues 242 and 244 for transferring data to and from the console management system, a data area containing network global information and identification information 246 and a LAN support layer 248 that is used to communicate with the NetBIOS layer.

The LAN support package uses a set of queues to communicate with the console management side. There is a queue for messages that are going to the console management package and queue for messages coming from the console management package. The queues may also be used to allow the console management program to communicate with the LAN support routines. The console management package simply reads its incoming messages and places its outgoing messages in the other queue. The outgoing messages must contain enough information for the LAN support routines to direct them through the network. This information must match the identification table information. Information coming from the LAN support routines will also carry identification information to allow the console management system to identify the source of the message. The identification information must consist of at least a unique node name that may be found in the identification tables and an identifier for each host if a multi-host system is being used.

The common data area for the LAN support routines contains data and tables that are accessible by the console management program. The two major tables that are accessible (but not changeable) are the identification table and the global variable area. The identification table contains the required information for NetBIOS to direct messages (this information is published by the groups supporting NetBIOS). It must also have identification information for the console management routine. It is the responsibility of the LAN support program to take identifier from the console management package, find the appropriate NetBIOS identifier and create the NetBIOS message. The LAN support routine must also be able to convert the NetBIOS identifier into a console management identifier. This allows the console management routine to ignore any NetBIOS considerations and establish a logical identification system of its own. The other purpose of the identification tables is to allow the console management system to identify other workstations on the network. Since the table is in a shared area, the console management program may obtain information from it about the status of other workstations. It is the responsibility of the LAN support routines to keep these tables up to date.

The second set of tables keep in the shared data area are the global variable area. Any time a global variable is updated, its new value is passed around the LAN to all other workstations. This updated value of this variable is then available to all console management systems on the LAN. The shared global area contains the name of each variable and its value. They may be interrogated at any time by the console management package. To change the values requires the console management package to send a request to the LAN support routines through the queues. This insures that the LAN support programs will know when a variable is changed.

The LAN support services themselves are responsible a for maintaining the above mentioned queues and data areas. These routines acquire messages from the network (through the NetBIOS layer), identify them, and process them. The processing may be to add them to the console management queue or to update internal tables.

The NetBIOS specification allows for two types of messages, datagrams and session messages. Datagrams are messages sent to all workstations on a LAN while session messages are sent between specific workstations. The LAN support routines use datagrams to update global variables and handle identification tables. The session messages are used to pass information between console management packages. Upon receiving a datagram, the LAN support programs analyze the message and either update appropriate tables, identification or global variable, or ignore the message. Datagrams that are ignored include identification messages for workstations that have already been identified.

Session messages are always processed and passed to the console management program. The message is identified, changed to the console management program format and placed on the inbound queue, (inbound to the console management package).

The LAN support programs are also responsible for taking messages from the console management queue, formatting them for NetBOIS, and sending them through NetBIOS.

To establish a session connection, the console management program will request session attachment from the LAN support routines based on the identification table information. If the LAN support routines cannot establish the connection, the console management program will receive an error message from the LAN support routines, otherwise the console management program will receive a connection message. The console management program will use the same process to break a connection.

Other responsibilities of the LAN support program are to send identification messages every few seconds to identify the workstation to any new workstations added to the LAN. The LAN support routines are also responsible for reporting NetBiOS errors and any other LAN communication problems to the console management program.

Figure 17:
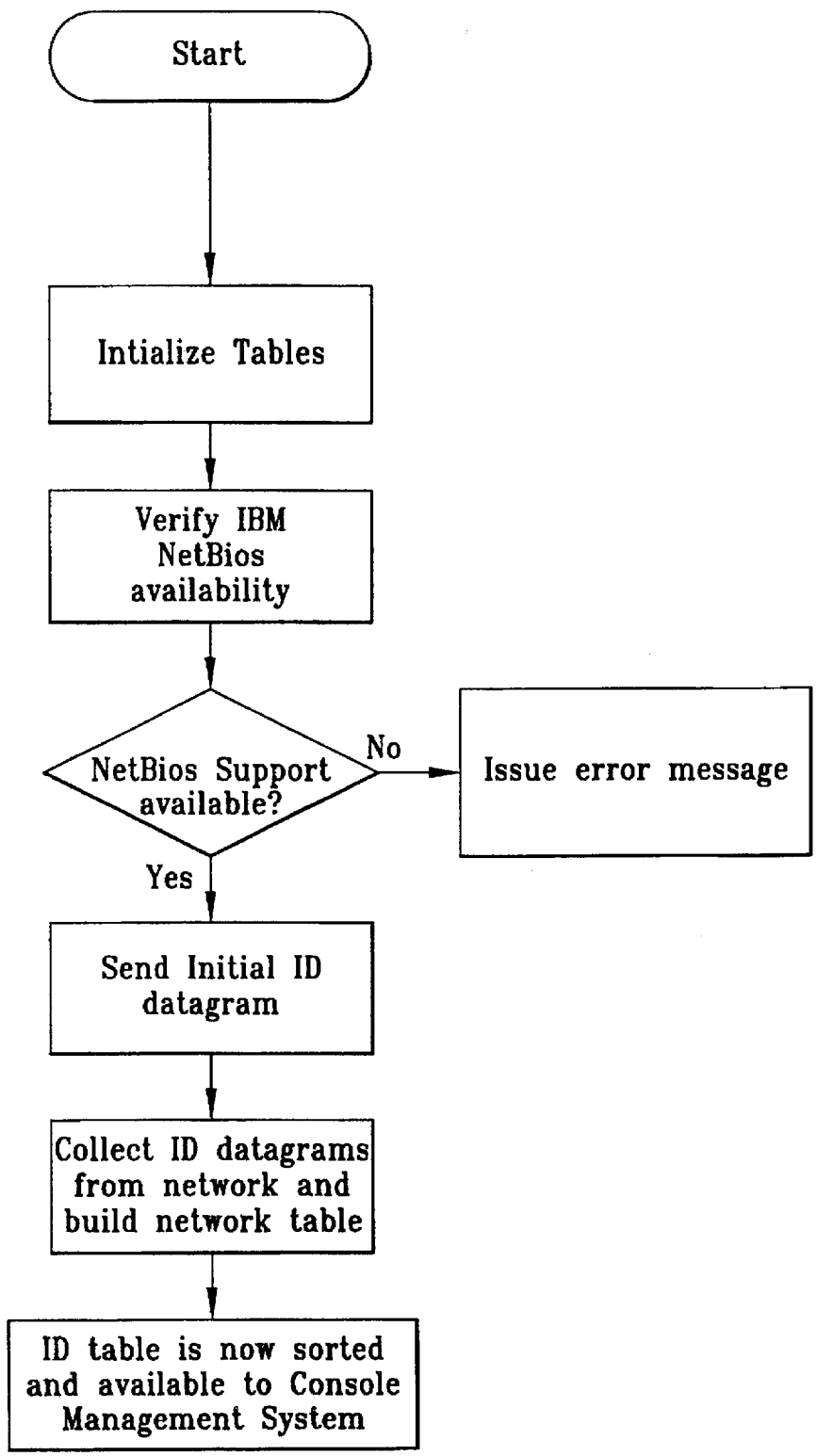
FIG. 17 is a flowchart of startup processing of the distribution of management of a central processing unit to multiple users.

FIG. 17 is a flowchart of a LAN support routine startup processing. The LAN support routines must be loaded by the console management program. They are not loaded by the DOS operating system, however, the NetBIOS support (supplied by third parties) must be loaded through DOS.

The first step of the LAN support routines are to initialize its internal tables. Since no network information is known at this time only local information is setup. This information includes the console management name for this workstation and the NetBIOS identification. This allows the LAN support program to start building its identification tables. This initialization process also sets up the communications queues for communication between LAN support and the console management program.

The next step is to verify the presence of the NetBiOS support program. NetBIOS itself is responsible for verifying the hardware support. If the NetBIOS program does not respond to the LAN support program or NetBIOS returns with an error condition, an error is issued to the console management program and the LAN support routines are stopped.

If NetBIOS is available, the LAN support routines issues the datagram that will identify it to the network. This datagram will be sent every few seconds from then on.

After the LAN support routines identify the workstation, it begins collecting datagrams from other workstations. This process usually lasts about 10 seconds. This should be adequate time to receive datagrams from all other workstations on the network and to build the identification tables. Datagrams for global information are also processed at this time if they are received.

Once the identification tables are complete, the LAN support routines inform the console management program that the network is available.

Figure 18:
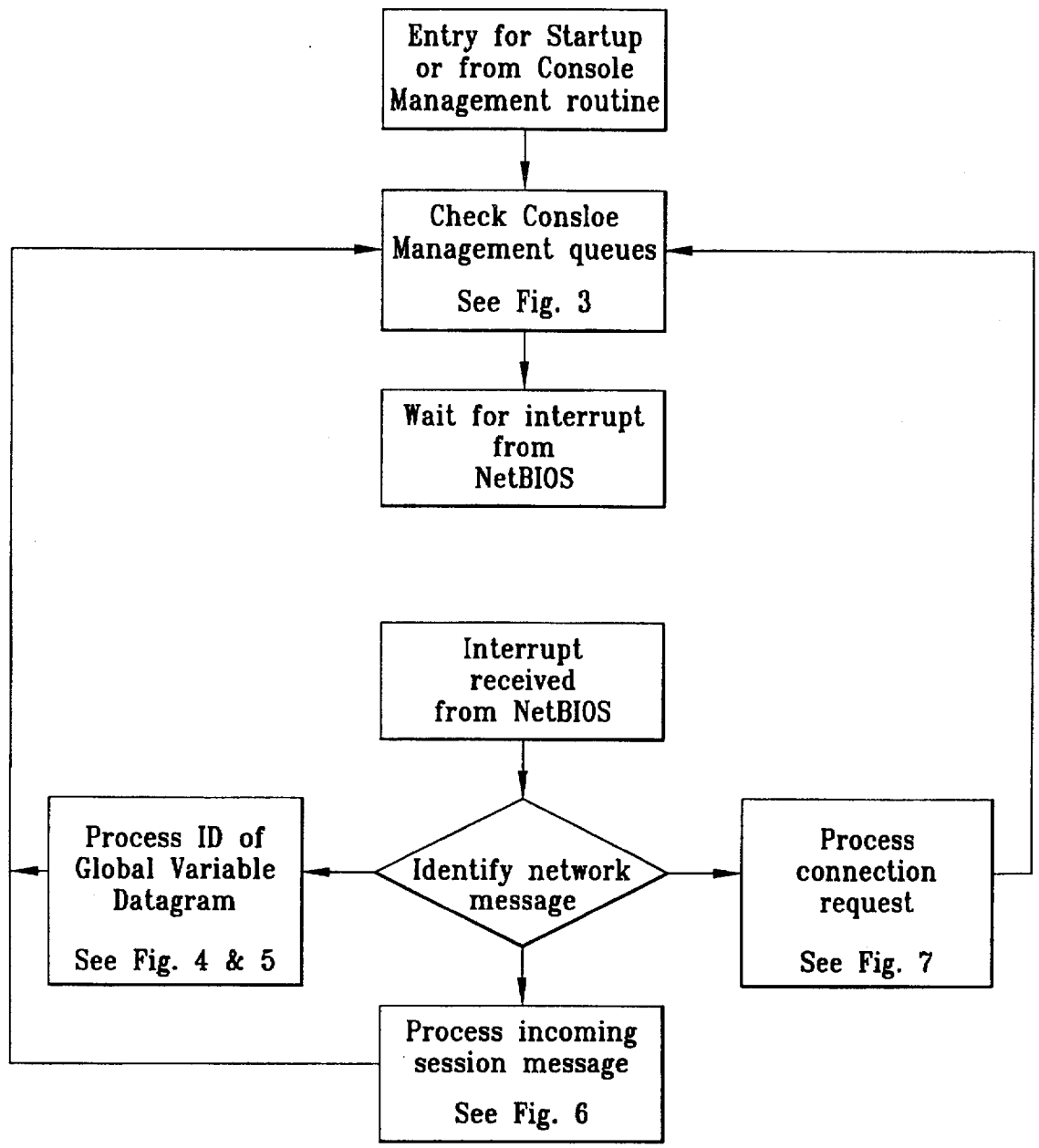
FIG. 18 is a flowchart of the main processing of the distribution of management of a central processing unit to multiple users.

FIG. 18 is a main processing loop of LAN support routines. The processing for the main loop of the LAN support routines are broken into two parts. The first step is to process any outbound messages from the console management system. The console management routine may place message(s) on the outbound queue and request the LAN support routines send it. Once the outbound message are processed the LAN support routines are placed in a wait state for the second part of the processing.

The second part of the processing is interrupt based. That is, any time a message comes from NetBIOS, the LAN support routine is interrupted (i.e., brought out of the wait state). Once interrupted, the LAN support routines get the message from NetBIOS, identify its message type and process it accordingly. Control is then passed to the first step of processing to check for any outbound messages.

The three classes of messages that may come from the network (through NetBOIS) are datagrams (containing ID information and global variable information), session messages, and session connection request (a special type of session message). Descriptions of these processes follows.

Figure 19:
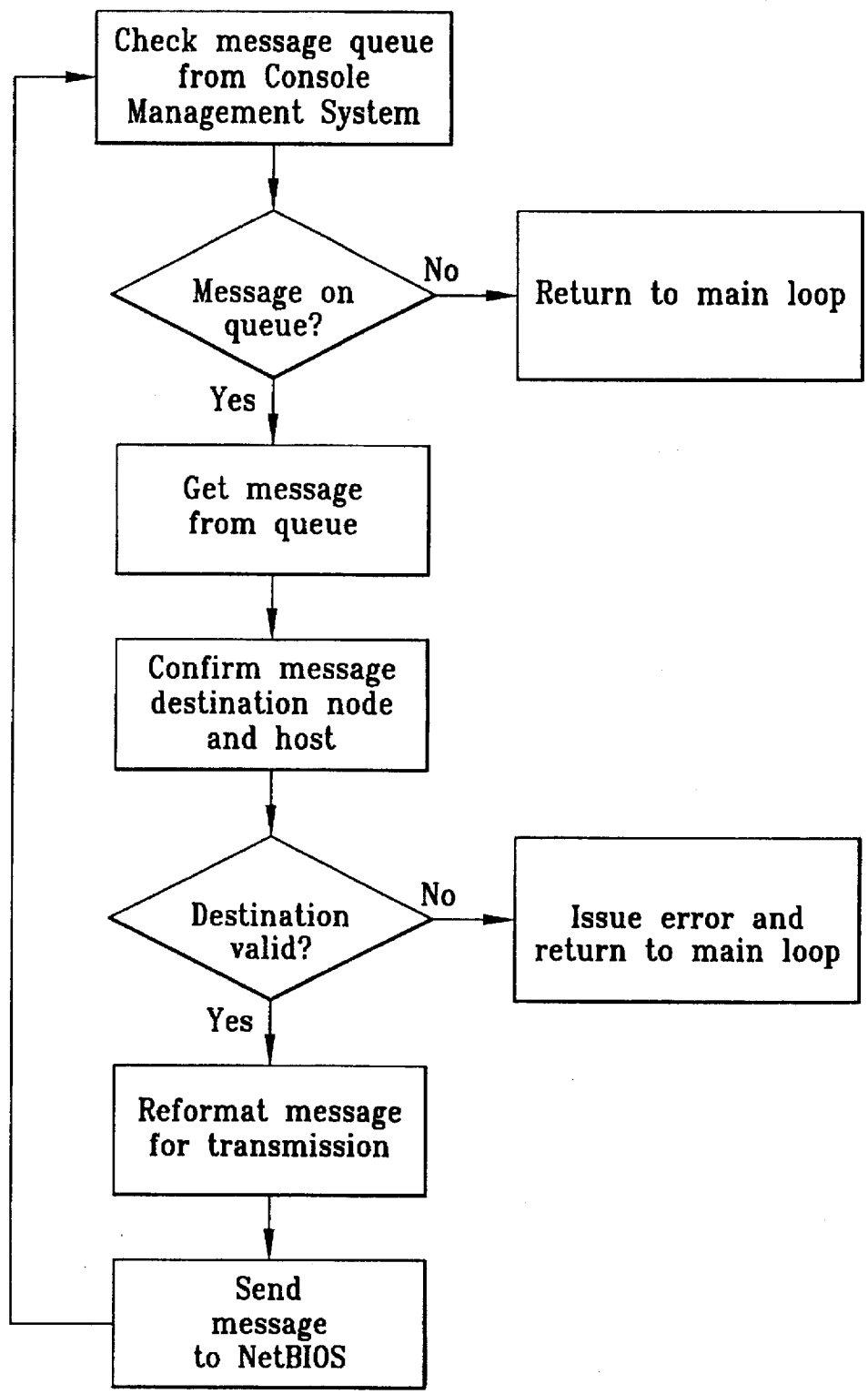
FIG. 19 is a flowchart of connectivity processing from the console management system of the distribution of management of a central processing unit to multiple users.

FIG. 19 is a flowchart of a processor for outbound messages. The first step of the outbound message processing is to check for outbound messages on the queue. If there are none, processing returns to the main loop.

If there is a message or message to be sent, it is taken from the queue and examined. The console management identifier is checked to see if the destination is correct and still available (the destination may have been shutdown or been removed due to network errors).

If the destination information is valid the message is reformatted into the NetBIOS message and sent to NetBIOS.

Figure 20:
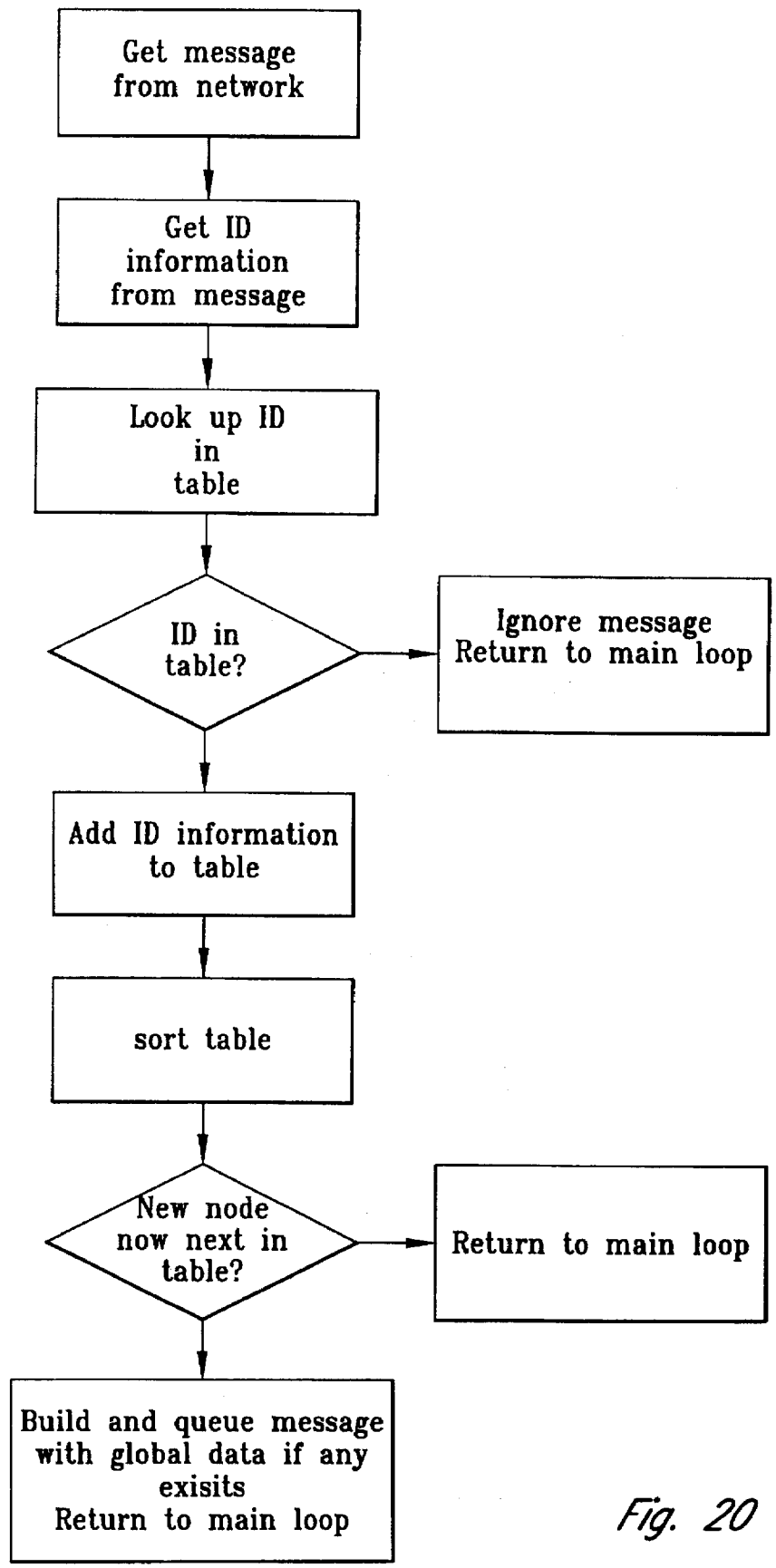
FIG. 20 is a flowchart of datagram ID processing of the distribution of management of a central processing unit to multiple users.

FIG. 20 is a flowchart of a datagram processor for identification of datagram. The processing of datagram may take two forms. The first is identification datagrams and the second is global variable datagrams.

The identification datagram is received by NetBIOS and analyzed by the LAN support routines. The ID information is then looked up in the identification tables. If the ID is already in the table, the message is ignored and processing returns to the main loop.

If the ID is not in the table, the information is taken from the message and an entry is made into the identification table. The table is then sorted.

If the new ID now appears directly after the local ID (i.e., the ID of the receiving workstation), a series of messages are built for any existing global variables. These messages are then sent through NetBIOS to allow the new workstation to establish its global variable table.

Figure 21:
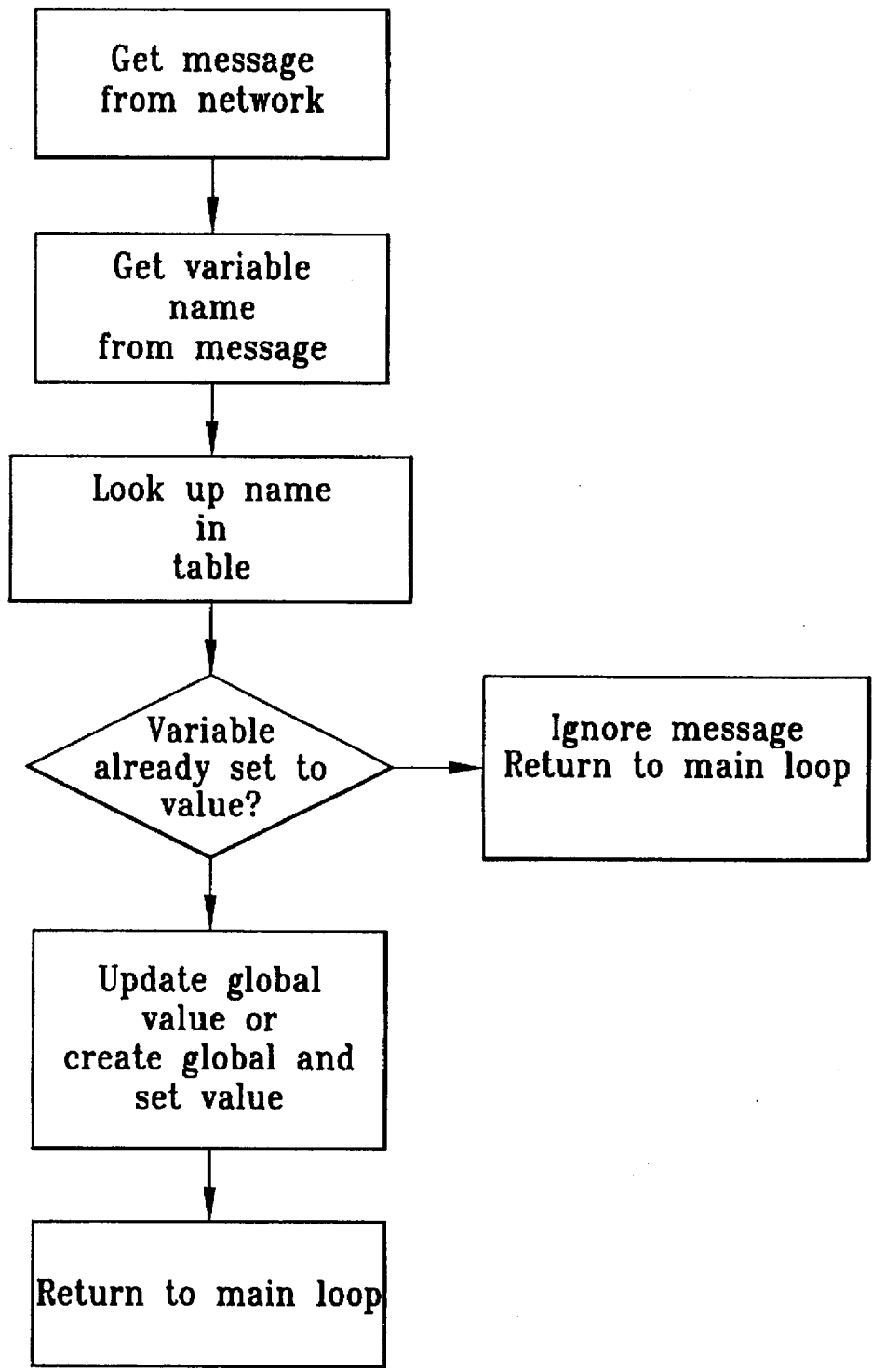
FIG. 21 is a flowchart of datagram global variable processing.

FIG. 21 is a flowchart of a datagram processor for global variable datagrams. The processing for global variables starts like all datagram processing. The datagram is received from NetBIOS and examined. If it is found to be a global variable update request the variable name and value are pulled from the message.

The variable name is checked to see if it is in the current list of global variable. If it is found the values match the request is ignored.

If the global variable is found with a different value, the current value is changed to the value supplied in the message.

If the global variable does not exist in the table, it is created and the value set to the value supplied in the message.

After these conditions have been met, the routine exits to the main loop.

Figure 22:
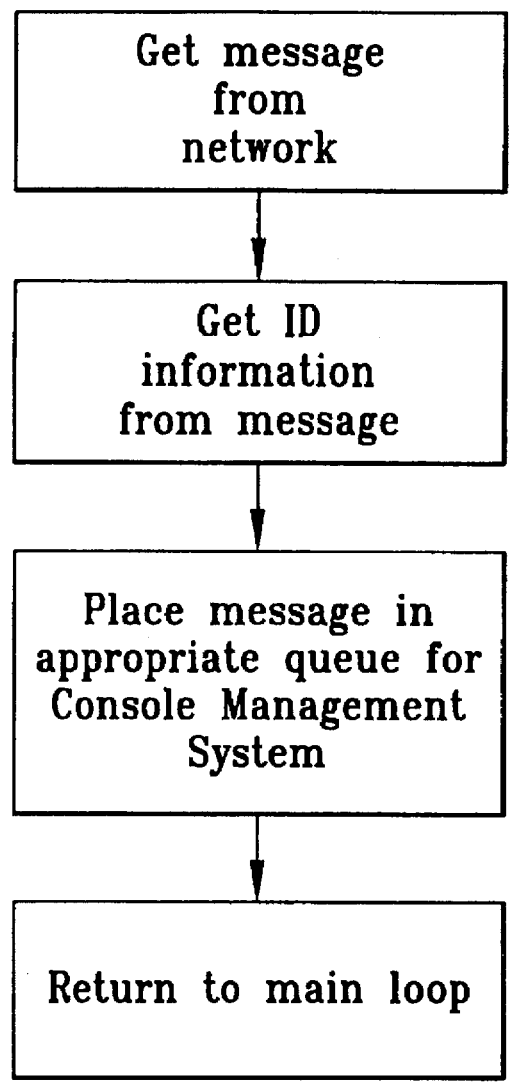
FIG. 22 is a flowchart of session message processing.

FIG. 22 is a session message processor. Session messages are those that are direct console management program to console management program communications. The processing done by the LAN support routines is to get the message from the network (NetBIOS) for processing. The next step is to check the identification information and find the console management identifier. The message is then placed on the inbound queue to the console management program with the appropriate identifier and a return is made to the main loop.

Most processing for session messages is handled through NetBiOS. NetBIOS insures that messages will go to the correct destination as well as assuring that they will arrive. Once a session is established between two workstations, NetBIOS assumes most of the responsibility for handling the message.

Figure 23:
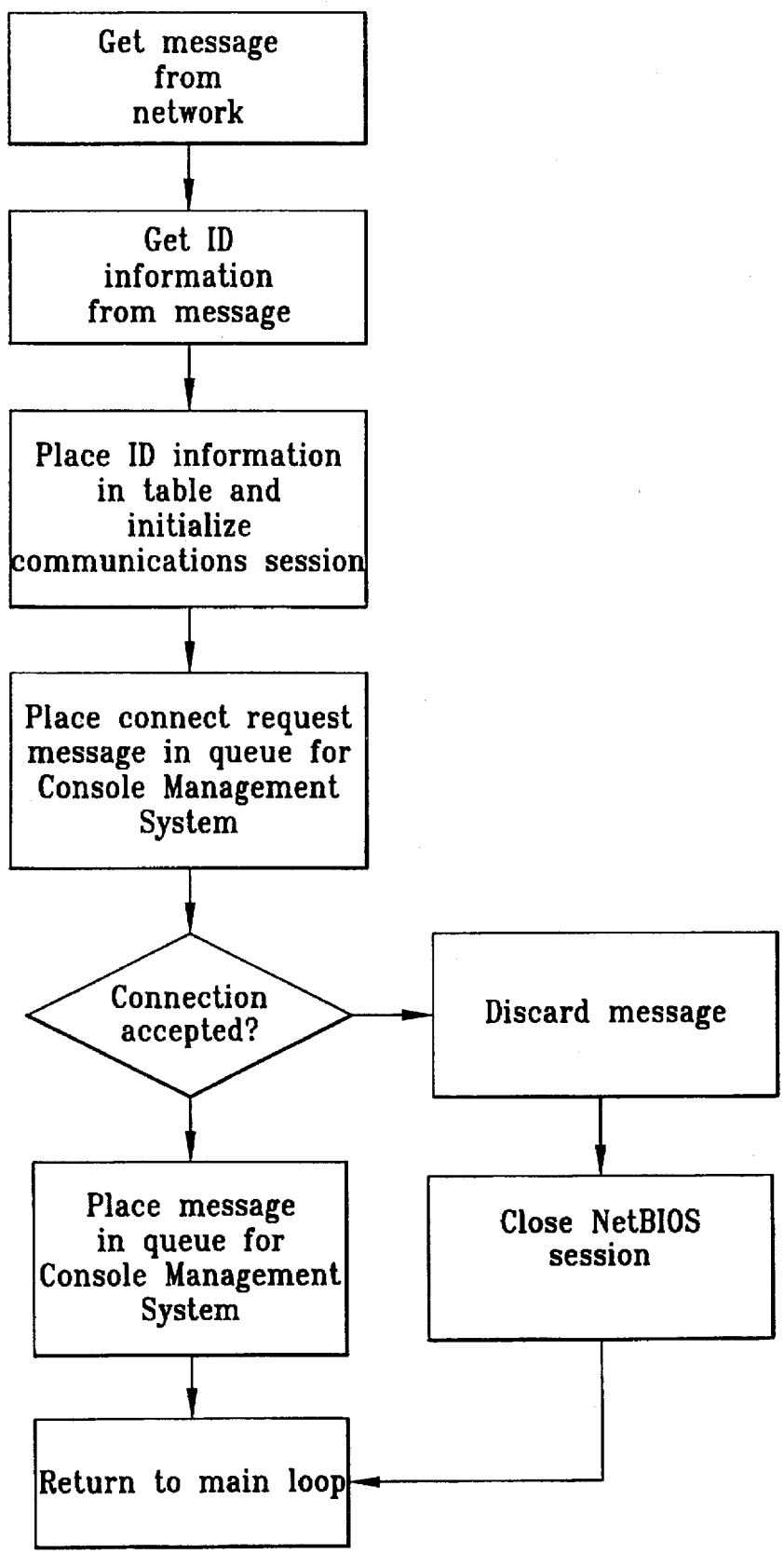
FIG. 23 is a flowchart of session connection processing.

FIG. 23 is a session connection request processor. To be able to send session message traffic between workstations, a session connection must first be established. This connection is done through NetBIOS and the console management program. The requesting console management program requests a session connection based on information from the identification table. The LAN support program then builds a request for NetBIOS and awaits a reply. This request is handled entirely by the NetBIOS support. NetBIOS will return a return code to the LAN support package as to whether the connection was successful. The return condition is then passed to the console management program. Since this process is mostly done within NetBIOS it is not detailed in the figure.

The processing on the receiving side requires more work by the LAN support routines. It is started by the first message from the requesting workstation. The message is interrogated for identification information and rebuilt for the receiving console management program. Before it is placed in the queue as a standard message, a connection request is sent to the console management program. If accepted, the message is processed in the normal fashion.

If connection is rejected, the LAN support program will discard the message and request NetBIOS close the session. The closing of the session will terminate the connection.

In any of the three areas discussed herein, procedural languages, such as C and assembler, may be used to implement the invention. Other languages, however, may be used.

Whereas, the present invention has been described in relation to the drawings attached hereto, it should be understood that other and further modifications, apart from those shown or suggested herein, may be made within the spirit and scope of this invention.

What is claimed is:

1. A method of monitoring a plurality of computer systems having central processing units, which method comprises:

storing mainframe operator messages from a mainframe operating system in a memory in communication with a central processing unit;

inputting operator data and messages into said memory through interface means;

transferring said mainframe operator messages, in a multi-tasking environment, between said central processing unit of the monitoring system and said central processing units of said monitored computer system;

scanning, recognizing and intercepting said mainframe operator messages destined for a human operator;

performing at least one step that would normally have to be performed by said human operator; and displaying said operator input data and messages and mainframe operator messages on a display in communication with said central processing unit of said monitoring system.

2. The method of monitoring a plurality of computer systems as set forth in claim 1 including the additional step of dividing said display into a plurality of windows and displaying messages from one said mainframe operating system in each said window.

3. The method of monitoring a plurality of computer systems as set forth in claim 1 including the additional step of transferring said mainframe operator messages among said plurality of monitored central processing units through a ring structure from one said monitored unit to an adjacent monitored unit until all said units have received said mainframe operator messages.

4. A monitoring multi-console management system, for monitoring a plurality of computer systems with central processing units, comprising:

a central processing unit;

memory means, in communication with said central processing unit, for storing mainframe operator messages from a mainframe operating system;

interface means for inputting operator data and messages into said memory means;

communication means for transferring said mainframe operator messages, in a multi-tasking environment, between said central processing unit of the monitoring system and said central processing units of said monitored computer system;

automation means to scan, recognize and intercept said mainframe operator messages destined for a human operator and to perform at least one step that would normally have to be performed by said human operator; and a display in communication with said central processing unit of said monitoring system for displaying said operator input data and messages and mainframe operator messages.

5. A multi-console management system of claim 4, wherein said plurality of monitored central processing units each includes a display in communication therewith and wherein said monitored central processing units are in communication with one another so as to enable said display of each central processing unit to display to the operator, operator input data and messages from said monitored computer system.

6. A multi-console management system of claim 4 wherein said display is divided into a plurality of windows wherein one monitored computer system is displayed in each said window.

7. A multi-console management system of claim 4 wherein said communication means transfers said mainframe operator messages among said monitored central processing units through a ring structure from one said monitored unit to an adjacent unit until all said monitored units have received said mainframe operator messages.

* * * * *